(12) United States Patent
 Chihara et al.

(10) Patent No.: US 8,863,160 B2
(45) Date of Patent: Oct. 14, 2014

(54) DISC DEVICE HAVING A CARRIER FOR RETAINING A PLURALITY OF DISCS IN A STACKED STATE

(71) Applicant: Panasonic Corporation, Osaka (JP)

(72) Inventors: Yasue Chihara, Osaka (JP); Takuto Yamazaki, Nara (JP); Tatsuro Nishi, Osaka (JP); Hirokuni Hagita, Osaka (JP); Takahiro Sato, Osaka (JP); Masanori Ohnishi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/903,306

(22) Filed: May 28, 2013

(65) Prior Publication Data

US 2013/0326548 A1    Dec. 5, 2013

(30) Foreign Application Priority Data

Jun. 4, 2012 (JP) ................................ 2012-127160

(51) Int. Cl.
 *G11B 17/22* (2006.01)
 *G11B 17/053* (2006.01)
 *G11B 23/03* (2006.01)

(52) U.S. Cl.
 CPC ............ *G11B 17/053* (2013.01); *G11B 17/225* (2013.01); *G11B 23/0323* (2013.01)
 USPC ...................... 720/615; 369/30.55; 369/30.85

(58) Field of Classification Search
 USPC ............ 369/30.55, 30.43, 30.7, 30.85, 30.92; 720/614, 615, 616
 See application file for complete search history.

(56) References Cited

U.S. PATENT DOCUMENTS

| 5,914,918 | A  | * | 6/1999  | Lee et al. | 369/30.32 |
| 6,064,544 | A  | * | 5/2000  | Wada | 360/92.1 |
| 6,111,847 | A  | * | 8/2000  | Assadian | 369/30.55 |
| 6,252,840 | B1 | * | 6/2001  | Miyoshi et al. | 369/30.78 |
| 6,304,525 | B1 | * | 10/2001 | Hayashi et al. | 369/30.43 |
| 6,744,704 | B1 | * | 6/2004  | Funaya et al. | 369/30.85 |
| 6,990,674 | B1 | * | 1/2006  | Cummins et al. | 720/623 |
| 7,146,620 | B2 | * | 12/2006 | Klein | 720/619 |
| 7,349,294 | B2 | * | 3/2008  | Lilland et al. | 369/30.57 |
| 8,245,247 | B2 | * | 8/2012  | Honma | 720/615 |
| 8,413,179 | B2 | * | 4/2013  | Inoue | 720/706 |
| 8,498,184 | B1 | * | 7/2013  | Kudinar et al. | 369/30.43 |
| 8,695,023 | B2 | * | 4/2014  | Nebashi | 720/615 |

(Continued)

FOREIGN PATENT DOCUMENTS

| JP | 2000-117553 | 4/2000 |
| JP | 2005-25888  | 1/2005 |
| JP | 2007-310920 | 11/2007 |
| JP | 2008-97733  | 4/2008 |
| JP | 2010-123185 | 6/2010 |
| JP | 2011-204311 | 10/2011 |

*Primary Examiner* — Brian Miller
(74) *Attorney, Agent, or Firm* — Wenderoth, Lind & Ponack, L.L.P.

(57) ABSTRACT

A disc device supplies a disc to each of a plurality of disc drives. The disc device includes a carrier which retains a plurality of discs being stacked in such a stacked state, which separates one disc from the retained plurality of discs above a tray ejected from an arbitrary one of the disc drives, and which places the separated disc on the tray. The carrier includes a plurality of claw portions holding the inner circumferential portion of the bottommost disc out of the plurality of discs, and a disc press pressing the topmost disc out of the plurality of discs so as to be in parallel to the disc placing face of the tray.

8 Claims, 41 Drawing Sheets

(56) References Cited

U.S. PATENT DOCUMENTS

| | | | |
|---|---|---|---|
| 2004/0017741 A1* | 1/2004 | Tatehata et al. | 369/30.85 |
| 2007/0201320 A1* | 8/2007 | Suzuki et al. | 369/30.78 |
| 2007/0267881 A1 | 11/2007 | Arai | |
| 2007/0268790 A1* | 11/2007 | Arai | 369/30.55 |
| 2007/0280057 A1* | 12/2007 | Ikeda | 369/30.34 |
| 2010/0125862 A1 | 5/2010 | Inoue | |
| 2013/0263162 A1* | 10/2013 | Yoshida et al. | 720/615 |
| 2013/0326549 A1* | 12/2013 | Nishi et al. | 720/615 |

* cited by examiner

Fig.36
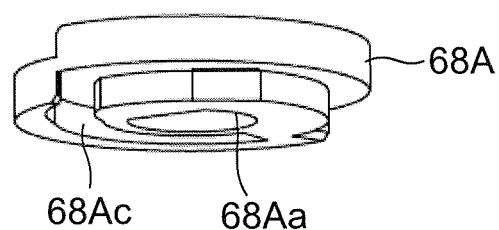
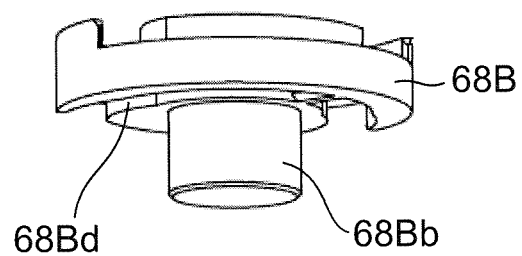

DISC DEVICE HAVING A CARRIER FOR RETAINING A PLURALITY OF DISCS IN A STACKED STATE

BACKGROUND OF THE INVENTION

1. Field of the Invention

The technical field relates to a disc device that supplies a disc (a disc-like information recording medium such as a CD or a DVD) to each of a plurality of disc drives.

2. Description of the Related Art

Conventionally, as a disc device of this type, a device disclosed in Patent Document 1 (No. 2011-204311 A) is known, for example. The disc device disclosed in Patent Document 1 includes a magazine that stores a plurality of trays that stores one disc, and a plurality of disc drives. The disc device disclosed in Patent Document 1 is structured such that: an arbitrary tray is drawn out from the magazine; one disc stored in the drawn out tray is suctioned and held by a suction pad; and the disc is placed on the tray of an arbitrary disc drive.

With the disc device disclosed in Patent Document 1, the number of discs that can be stored in the magazine is small because the disc device is structured to store one disc per tray. For increasing the number of discs stored in the magazine, it may be effective to directly stack a plurality of discs without use of the trays, to thereby reduce the number of trays.

However, in this case, the discs being adjacent to one another stick fast together, and will not be separated from one another easily. Patent Document 2 (No. 2000-117553 A) discloses the technique for solving such a problem. Patent Document 2 discloses the following technique: separating adjacent two discs from each other by inserting claw portions between the two discs; and allowing the separated discs to be suctioned and held by suction pads.

PATENT DOCUMENTS

Patent Document 1: JP 2011-204311 A
Patent Document 2: JP 2000-117553 A

A further increase in the number of stored discs is demanded of such disc devices. In order to increase the number of stored discs, simply thinking, the number of magazines should be increased.

However, an increase in the number of pieces of magazines inevitably increases the distance between the disc drive and a magazine that is placed at the farthest position from the disc drive. This invites an increase in the disc conveying time. Further, since the disc device disclosed in Patent Document 1 is structured to supply the disc one by one from the magazine to the disc drives, considerable time is required for supplying the discs to the plurality of disc drives.

Further, the technique disclosed in Patent Document 2 cannot prevent the increase in time of supplying the discs to the plurality of disc drives.

Accordingly, the applicant of the present disclosure has developed a disc device including a carrier that retains a stacked plurality of discs in such a stacked state, that separates one disc from the retained plurality of discs above a tray ejected from an arbitrary disc drive, and that places the separated disc onto the tray.

With the disc device, since it is not necessary to cause a suction pad suctioning and holding each disc to reciprocate between the magazine and the disc drive as disclosed in Patent Document 1, an increase in the time required for supplying the discs to the plurality of disc drives can be avoided.

The disc device is structured to: insert a spindle unit into the center holes of the stacked plurality of discs; causing a plurality of claw portions to project from the spindle unit; holding the bottommost disc by the plurality of claw portions; and retaining the plurality of discs in such a stacked state. In other words, the disc device is structured to hold only the inner circumferential portion of the bottommost disc by the plurality of claw portions, to retain the plurality of discs in the stacked state. Accordingly, the outer circumferential side of the discs tends to wobble, and the discs may fail to be accurately placed on the tray.

SUMMARY OF THE INVENTION

Accordingly, one non-limiting and exemplary embodiment provides a disc device that can stably retain a stacked plurality of discs in such a stacked state, and that can place each disc on the tray of each of a plurality of disc drives more accurately.

According to the present invention, there is provided a disc device supplying a disc to each of a plurality of disc drives, the disc device comprising a carrier which retains a plurality of discs being stacked in such a stacked state, which separates one disc from the retained plurality of discs above a tray ejected from an arbitrary one of the disc drives, and which places the separated disc on the tray, wherein the carrier includes:

a plurality of claw portions which hold an inner circumferential portion of a bottommost disc out of the plurality of discs; and a disc press which presses a topmost disc out of the plurality of discs so as to be in parallel to a disc placing face of the tray.

With the disc device of the present disclosure, provision of the disc press makes it possible to stably retain the stacked plurality of discs in such a stacked state, and to more accurately place a disc to corresponding one of the trays of the plurality of disc drives.

BRIEF DESCRIPTION OF THE DRAWINGS

FIG. 36 is a perspective view of two cam plates included in the camshaft unit shown in FIG. 35 as seen diagonally from below.

DETAILED DESCRIPTION OF THE INVENTION

Figure 1:
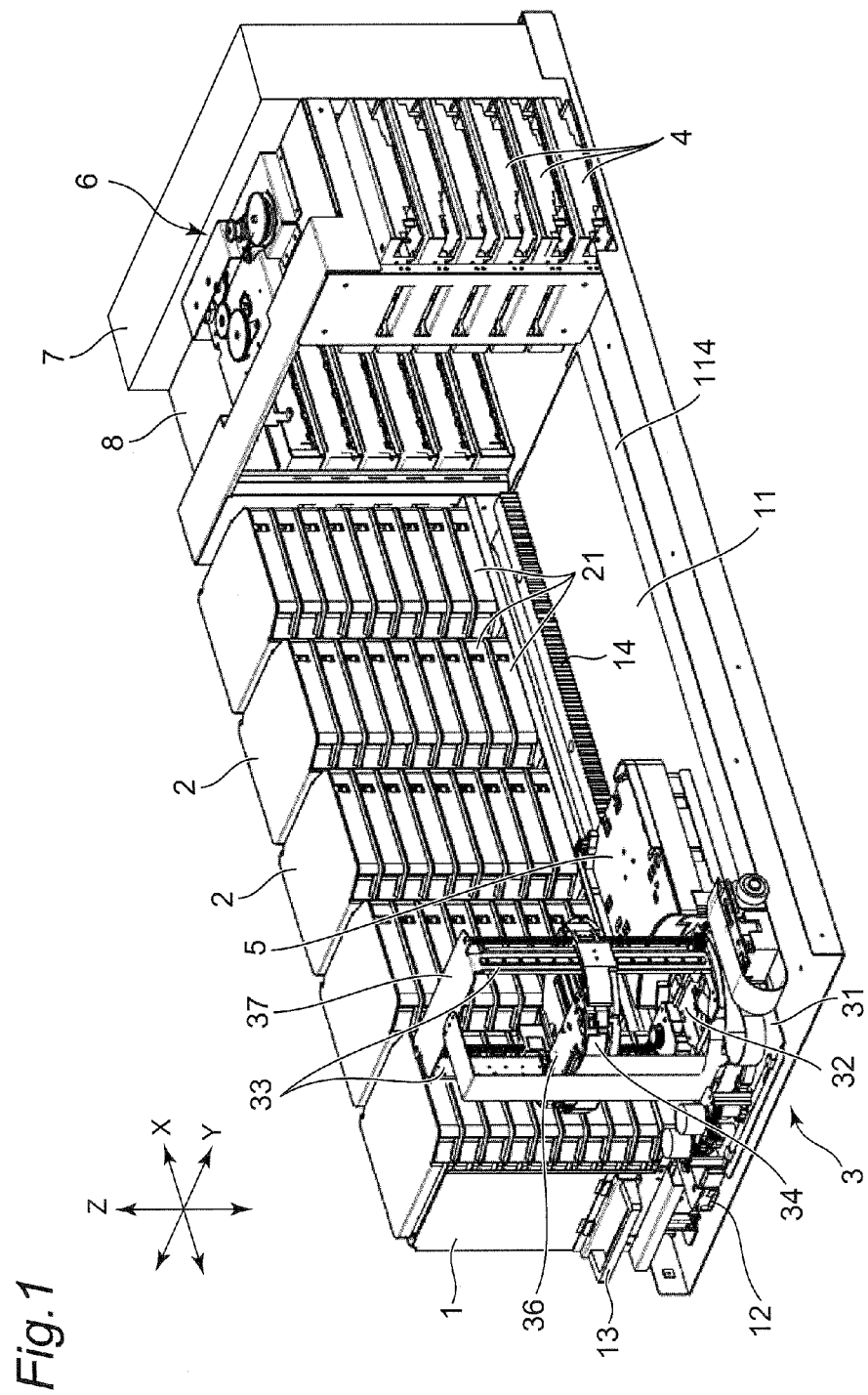
FIG. 1 is a perspective view showing the schematic structure of a disc device according to an embodiment of the present disclosure.

According to a first aspect of the present disclosure, there is provided a disc device supplying a disc to each of a plurality of disc drives, the disc device comprising a carrier which retains a plurality of discs being stacked in such a stacked state, which separates one disc from the retained plurality of discs above a tray ejected from an arbitrary one of the disc drives, and which places the separated disc on the tray, wherein the carrier includes:

a plurality of claw portions which hold an inner circumferential portion of a bottommost disc out of the plurality of discs; and a disc press which presses a topmost disc out of the plurality of discs so as to be in parallel to a disc placing face of the tray.

According to a second aspect of the present disclosure, there is provided the disc device according to the first aspect, wherein the disc press is provided so as to be rotatable about one end portion of the disc press, and so that other end portion of the disc press is brought into contact with the topmost disc.

According to a third aspect of the present disclosure, there is provided the disc device according to the second aspect, wherein the other end portion of the disc press is provided so as to be brought into contact with a substantial diameter portion of the topmost disc.

According to a fourth aspect of the present disclosure, there is provided the disc device according to the second or third aspect, wherein the other end portion of the disc press is provided so as to, in planar view, pass a line segment connecting between two claw portions out of the plurality of claw portions, and to extend in a direction crossing the line segment.

According to a fifth aspect of the present disclosure, there is provided the disc device according to the fourth aspect, wherein a length of a contact portion between the topmost disc and the other end portion of the disc press is substantially identical to a length of a diameter of the disc subtracted by a diameter of a center hole of the disc.

According to a sixth aspect of the present disclosure, there is provided the disc device according to the first aspect, wherein the carrier further includes a disc height position detecting unit detecting a height position of the topmost disc.

According to a seventh aspect of the present disclosure, there is provided the disc device according to any one of the second to fifth aspects, wherein the carrier includes a disc height position detecting unit, the disc height position detecting unit sensing a rotation amount of the disc press to sense a height position of the topmost disc.

According to an eighth aspect of the present disclosure, there is provided the disc device according to any one of the first to seventh aspects, further comprising a disc presence-absence detecting unit being out of contact with the disc press when the carrier retains the disc, and being in contact with the disc press when the carrier does not retain the disc, to sense presence and absence of the disc retained by the carrier.

In the following, with reference to the drawings, a description will be given of an embodiment of the present disclosure.

It is to be noted that, identical reference characters are allotted to identical or corresponding parts throughout the drawings referred to in the following, and description thereof will not be repeated.

Embodiment

FIG. 1 is a perspective view showing the schematic structure of a disc device according to an embodiment of the present disclosure. It is to be noted that, in the present embodiment, the left side in FIG. 1 is referred to as the "device-front side", and the right side in FIG. 1 is referred to as the "device-rear side".

Firstly, with reference to FIG. 1, a description will be given of an overall structure of the disc device according to the present embodiment.

The disc device according to the present embodiment includes two magazine stockers 1, 1. The two magazine stockers 1, 1 are provided on a bottom chassis 11 so as to oppose to each other in a device width direction Y. It is to be noted that, in FIG. 1, one of the magazine stockers 1 (on the near side) is not shown. Further, the top panel and the partition plate of the magazine stocker 1 are not shown in FIG. 1.

Each magazine stocker 1 stores a plurality of magazines 2. Each magazine 2 includes magazine trays 21 storing a plurality of (e.g., 12 pieces of) discs. Between the two magazine stockers 1, 1, a picker 3 that draws out the magazine tray 21 from one magazine 2 selected from a plurality of magazines 2 and that holds the magazine tray 21 is provided.

The picker 3 is structured to convey the held magazine tray 21 to a position near a plurality of disc drives 4 arranged at the device-rear side. The picker 3 is integrally provided with a lifter 5 that pushes out a plurality of discs from the magazine tray 21.

The disc drives 4 are each an apparatus that performs recording or reproducing of information on or from a disc. Further, the disc drives 4 are each a tray-scheme disc drive that load discs using trays. The plurality of disc drives 4 are stacked in a device height direction Z, and arranged so as to be adjacent to the magazine stockers 1, 1 on the device-rear side. Between the plurality of disc drives 4 arranged as being stacked so as to be adjacent to one magazine stocker 1 and the plurality of disc drives 4 arranged as being stacked so as to be adjacent to the other magazine stocker 1, a carrier 6 is provided.

The carrier 6 is structured to: retain a plurality of discs pushed out by the lifter 5 in such a stacked state; separate one disc from the retained plurality of discs above a tray 4a (see FIG. 23) ejected from an arbitrary disc drive 4; and place the separated disc on the tray 4a.

Further toward the device-rear side than the carrier 6 and the plurality of disc drives 4, an electric circuit and a power supply 7 are provided. The electric circuit and the power supply 7 are provided with a control unit that controls operations (motor and the like) of devices such as the picker 3, the disc drives 4, the carrier 6, and the like. The control unit is connected to, for example, a host computer that manages data. The host computer sends commands to the control unit to perform operations such as data reading from or writing on the specified magazine 2, based on instructions from the operator. The control unit controls the operation of the devices such as the picker 3, the disc drive 4, the carrier 6, and the like according to the commands.

Next, a description will be given of the structure of the aforementioned devices and components in more detail.

The magazine stockers 1 are provided along guide rails 12 that slidably guide the picker 3. The guide rails 12 are provided so as to extend in a device depth direction X (in the longitudinal direction of the magazine stockers 1). A grip 13 is provided at the side face on the device-front side of each magazine stocker 1. The magazine stocker 1 can be shifted toward the device-front side by the grip 13 being pulled. Each magazine stocker 1 is provided with a partition plate (not shown) formed to be grid-like as seen from the device width direction Y. In each of the space surrounded by the partition plate, the magazine 2 is stored.

Figure 2A:
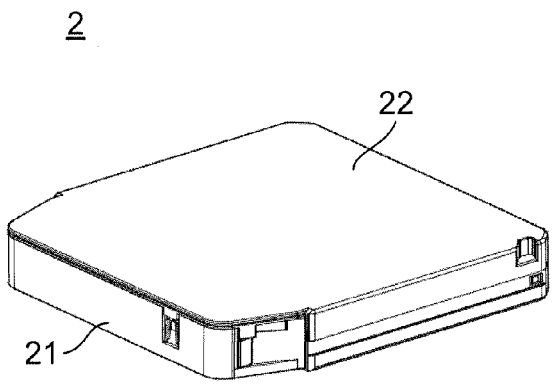
FIG. 2A is a perspective view of a magazine included in the disc device shown in FIG. 1.
Figure 2B:
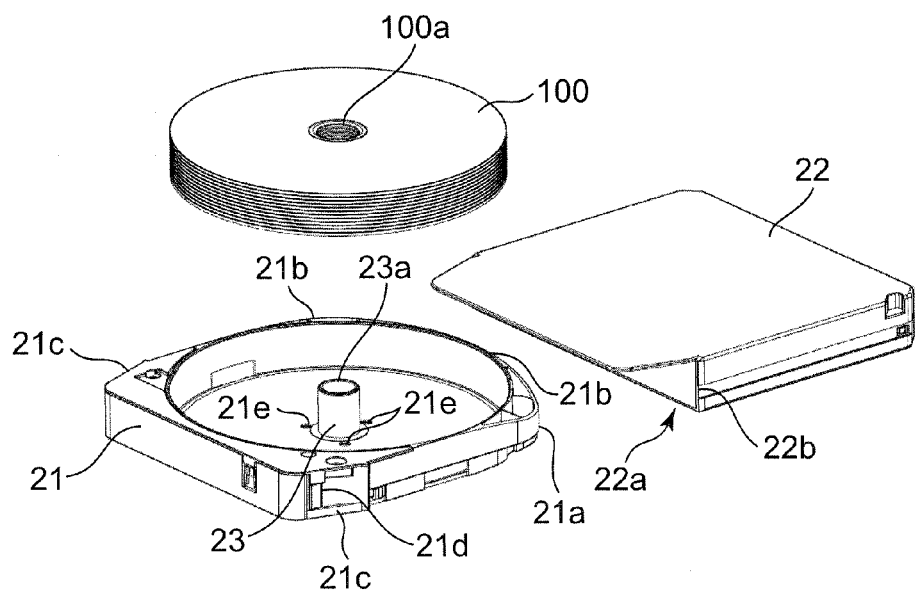
FIG. 2B is an exploded perspective view of the magazine shown in FIG. 2A.

As shown in FIG. 2A, the magazine 2 includes the magazine tray 21, and a case 22 that has a substantially rectangular parallelepiped shape and that stores the magazine tray 21. As shown in FIG. 2B, at the front face (one side face) of the case 22, an opening 22a into which the magazine tray 21 can be inserted and taken out is provided.

The magazine tray 21 is formed to have an outer shape being substantially rectangular in planar view. The magazine tray 21 stores a plurality of discs 100 as being stacked in close contact with one another. At the opposing corner portions that position on the back side of the magazine case 22 in a state where the magazine tray 21 is stored in the case 22, cut portions 21a, 21a are formed. Further, a side face 21b that positions on the back side of the magazine case 22 in the state where the magazine tray 21 is stored in the magazine case 22 is formed to be arc-like as a whole including the cut portions 21a, 21a.

At the opposing corner portions that position on the front face side of the case 22 in the state where the magazine tray 21 is stored in the case 22, cutout portions 21c, 21c are formed. On the inner side of the cutout portions 21c, 21c in the width direction of the magazine tray 21, engaging recess portions 21d, 21d with which a pair of hooks 35, 35, whose description will follow, engage are formed.

The magazine tray 21 is provided with a core rod, which is inserted into a center hole 100a provided at each of the plurality of discs 100 to restrict shifting of the discs 100 in the plane direction. This core rod 38 prevents the discs 100 from being damaged by such shifting of the discs 100 in the plane direction. The core rod 23 is provided with an engaging portion 23a for engaging with a spindle head 67b of a disc chuck unit 62, whose description will follow.

Near the core rod 23, at least one hole 21e into which up-and-down pins 52a of the lifter 5, whose description will follow, are provided. In the present embodiment, three holes 21e are provided at an interval of 120 degrees. Further, the three holes 21e are provided at the position opposing to the non-recording-and-reproducing region of the inner circumferential portion of each disc 100 when the disc 100 is inserted into the core rod 23.

Figure 3:
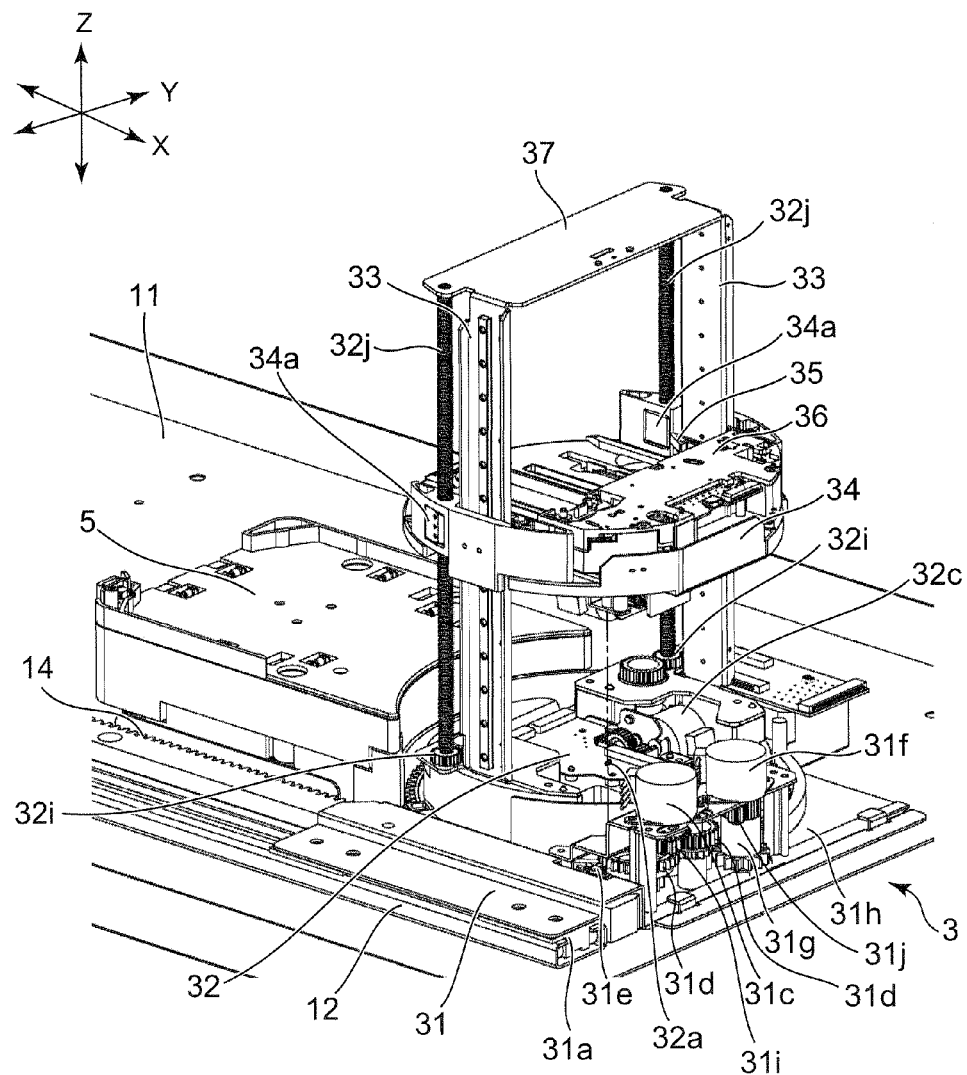
FIG. 3 is a perspective view of a picker included in the disc device shown in FIG. 1.
Figure 4:
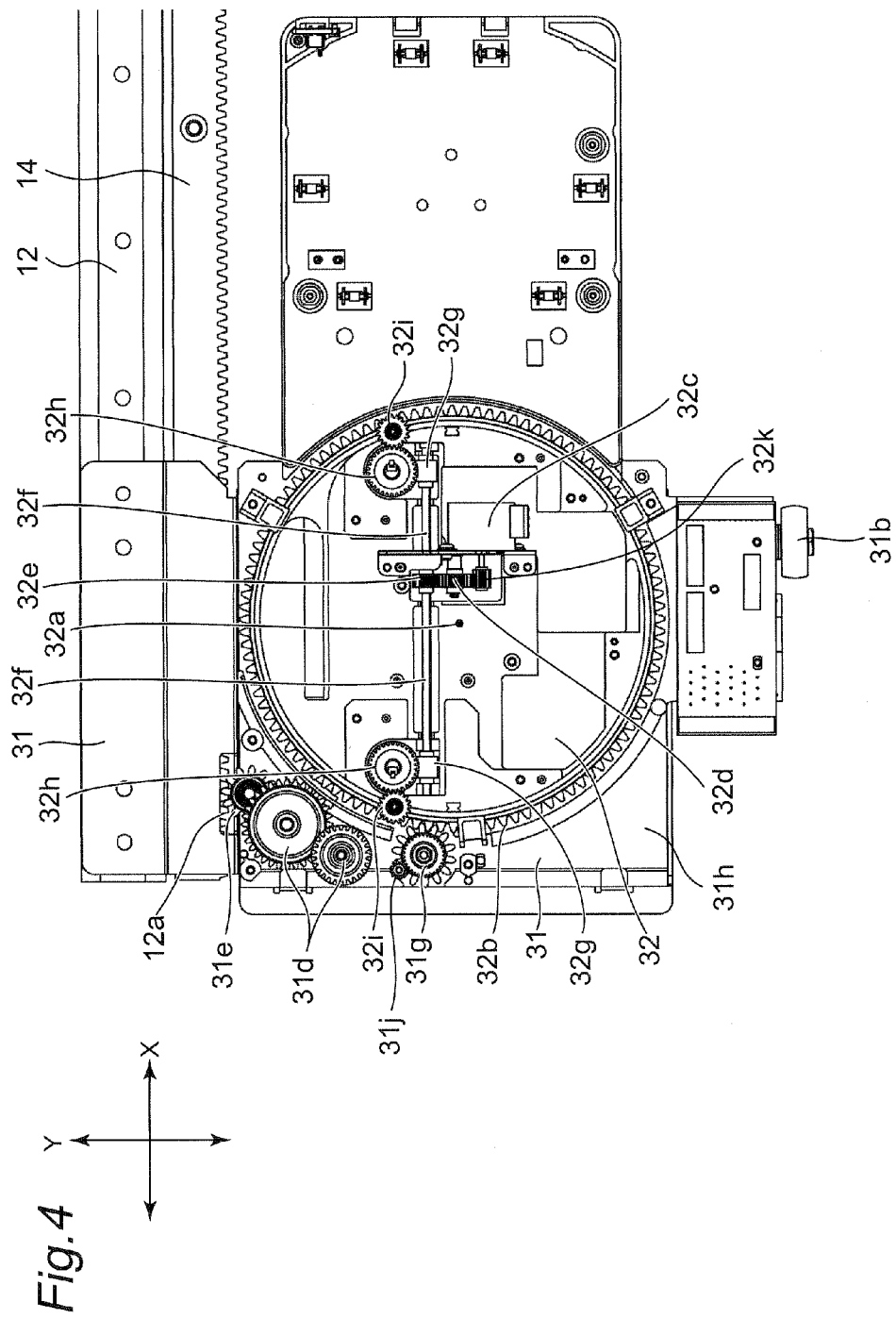
FIG. 4 is a plan view showing the structure of a drive system of an up-and-down table included in the picker shown in FIG. 3.

The picker 3 includes a run base 31. As shown in FIG. 3, a movable platform 31a slidably shifting along the guide rail 12 is attached on one magazine stocker 1 side of the run base 31. Further, as shown in FIG. 4, a roller 31b is attached on other magazine stocker 1 side of the run base 31.

As shown in FIG. 3, the run base 31 is provided with a picker motor 31c that produces drive force for causing the picker 3 to shift in the device depth direction X. A reduction gear 31d meshes with a motor gear 31i, into which the drive shaft of the picker motor 31c is press fitted. The reduction gear 31d meshes with a pinion gear 31e. The pinion gear 31e meshes with a rack 14 provided adjacent to the guide rail 12 to extend in the device depth direction X.

When the picker motor 31c is driven, the drive force of the picker motor 31c is transferred to the pinion gear 31e via the motor gear 31i and the reduction gear 31d, to rotate the pinion gear 31e. Here, the rack 14 is fixed to the bottom chassis 11.

On the other hand, the run base 31 is not fixed to the bottom chassis 11. Accordingly, when the pinion gear 31e rotates, the pinion gear 31e shifts along the rack 14, whereby the picker 3 shifts in the device depth direction X.

As the picker motor 31c, for example, a stepping motor is employed. Applying a prescribed pulse to the picker motor 31c, the picker 3 can be shifted to be located at the front of a prescribed magazine 2.

A picker base 31h made of resin is attached to the run base 31 made of a sheet metal. The picker base 31h is provided with a rotary table 32 so as to be rotatable substantially about a rotation axis 32a extending in the device height direction Z. Further, the picker base 31h is provided with a rotary table motor 31f that produces the drive force for causing the rotary table 32 to rotate. As shown in FIG. 4, a reduction gear 31g meshes with the motor gear 31j, into which the drive shaft of the rotary table motor 31f is press fitted. The reduction gear 31g meshes with a rotary table gear 32b provided at the outer circumferential portion of the rotary table 32. When the rotary table motor 31f is driven, the drive force of the rotary table motor 31f is transferred to the rotary table gear 32b via the motor gear 31j and the reduction gear 31g, whereby the rotary table 32 rotates.

The rotary table 32 is provided with a pair of up-and-down rails 33, 33 extending along the device height direction Z and opposing to each other. Between the pair of up-and-down rails 33, 33, an up-and-down table 34 is provided. Further, the rotary table 32 is provided with an up-and-down table motor 32c that produces the drive force for causing the up-and-down table 34 to rise and lower.

As shown in FIG. 4, a relay gear 32d meshes with a motor gear 32k, into which the drive shaft of the up-and-down table motor 32c is press fitted. The relay gear 32d meshes with a coupling shaft gear 32e. A coupling shaft 32f penetrates through the center portion of the coupling shaft gear 32e. Worms 32g, 32g are fixed to the opposite ends of the coupling shaft 32f. The worms 32g mesh with relay gears 32h. The relay gears 32h mesh with lead screw gears 32i. The lead screw gears 32i are fixed to lead screws 32j. The lead screws 32j are provided so as to extend in the device height direction Z along the up-and-down rails 33. As shown in FIG. 3, nuts 34a provided to the up-and-down table 34 are screwed with the lead screws 32j.

When the up-and-down table motor 32c is driven, the drive force of the up-and-down table motor 32c is transferred to the lead screws 32j via the motor gear 32k, the relay gear 32d, the coupling shaft gear 32e, the coupling shaft 32f, the worms 32g, the relay gears 32h, and the lead screw gears 32i, whereby the lead screws 32j rotate. Thus, the up-and-down table 34 rises and lowers in the device height direction Z along the pair of up-and-down rails 33 and 33.

Figure 8:
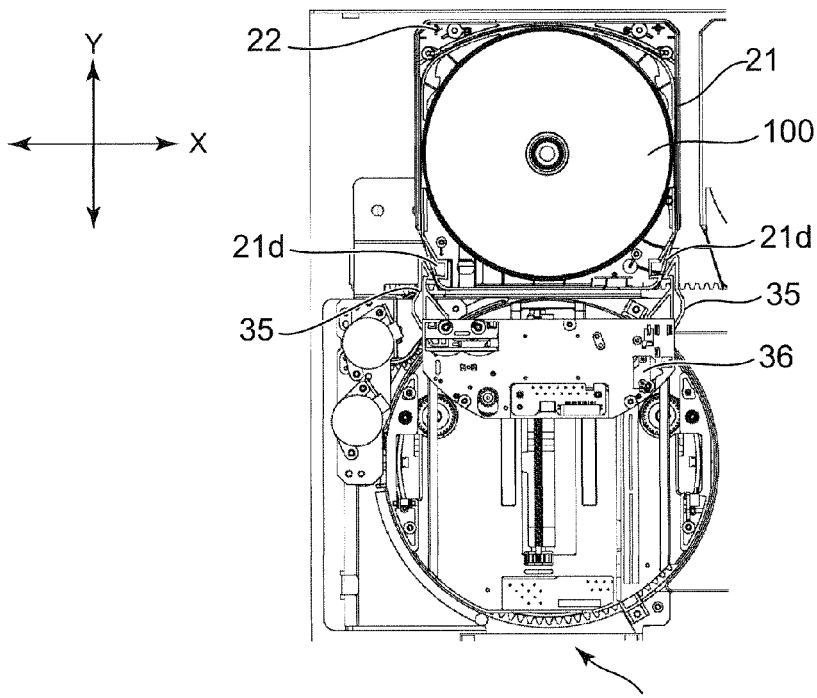
FIG. 8 is a plan view showing the manner of the picker shown in FIG. 3 drawing out the magazine tray from the magazine.

As shown in FIG. 8, the up-and-down table 34 is provided with a pair of hooks 35, 35 that can engage with engaging recess portions 21d of the magazine tray 21, and a chuck 36 functioning to open and close the pair of hooks 35, 35 and to cause the pair of hooks 35, 35 to shift forward and backward.

Figure 5:
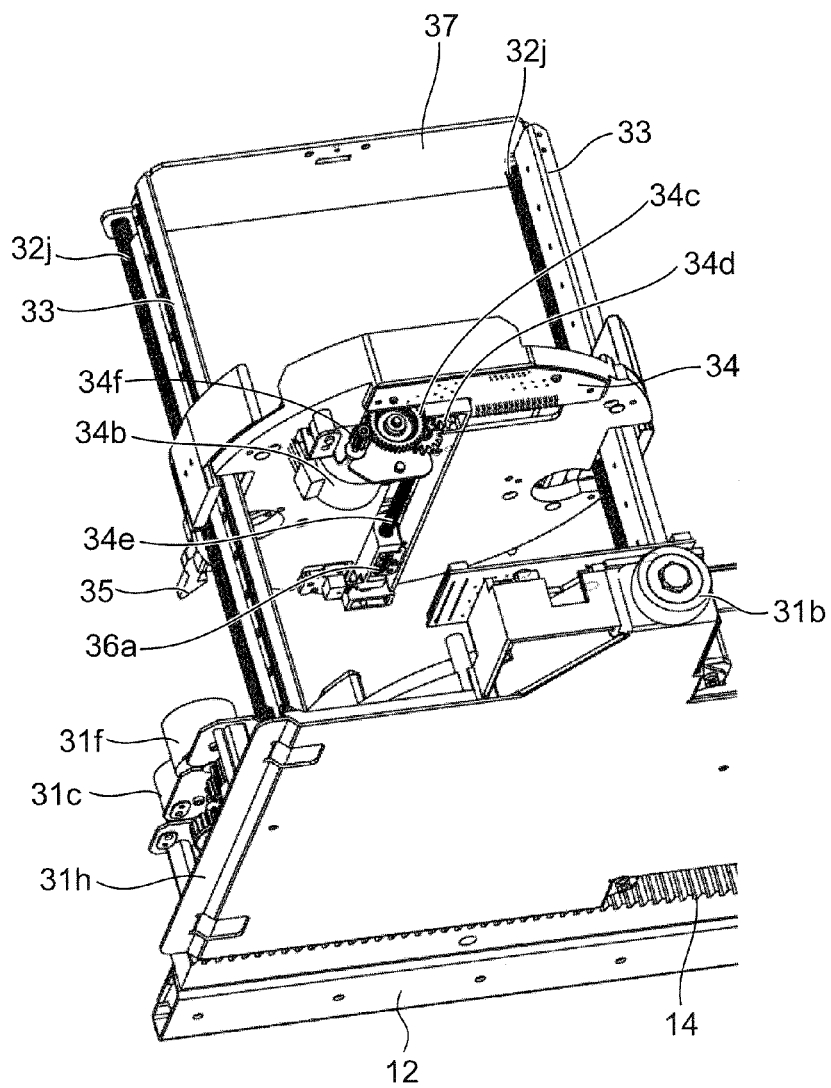
FIG. 5 is a perspective view of the picker shown in FIG. 3 as seen diagonally from below.

Further, as shown in FIG. 5, the up-and-down table 34 is provided with a chuck motor 34b. A reduction gear 34c meshes with a motor gear 34f, into which the drive shaft of the chuck motor 34b is press fitted. The reduction gear 34c meshes with a lead screw gear 34d. The lead screw gear 34d is fixed to a lead screw 34e. The lead screw 34e is provided to extend in the direction perpendicular to the line connecting between the pair of up-and-down rails 33 and 33. A nut 36a fixed to the chuck 36 is screwed with the lead screw 34e.

When the chuck motor 34b is driven, the drive force of the chuck motor 34b is transferred to the nut 36a via the motor gear 34f, the reduction gear 34c, the lead screw gear 34d, and the lead screw 34e, whereby the chuck 36 shifts along the lead screw 34e.

Further, the chuck 36 is structured to be capable of adjusting the interval of the pair of hooks 35, 35. By the chuck 36 reducing the interval between the pair of hooks 35, 35, the pair of hooks 35, 35 can engage with the engaging recess portions 21d, 21d of the magazine tray 21. On the other hand, by the chuck 36 increasing the interval of the pair of hooks 35, 35, the engaged state between the pair of hooks 35, 35 and the engaging recess portions 21d, 21d of the magazine tray 21 can be released.

The paired up-and-down rails 33 are attached to opposite side faces of a U-shaped angle plate 37, respectively. The top end portions of the paired lead screws 32j are rotatably attached to the top face of the angle plate 37.

The picker motor 31c, the rotary table motor 31f, the up-and-down table motor 32c, and the chuck motor 34b are connected to the control unit of the electric circuit and the power supply 7 via an FFC (flexible flat cable) 114 (see FIG. 1), and drive under control of the control unit.

Figure 6:
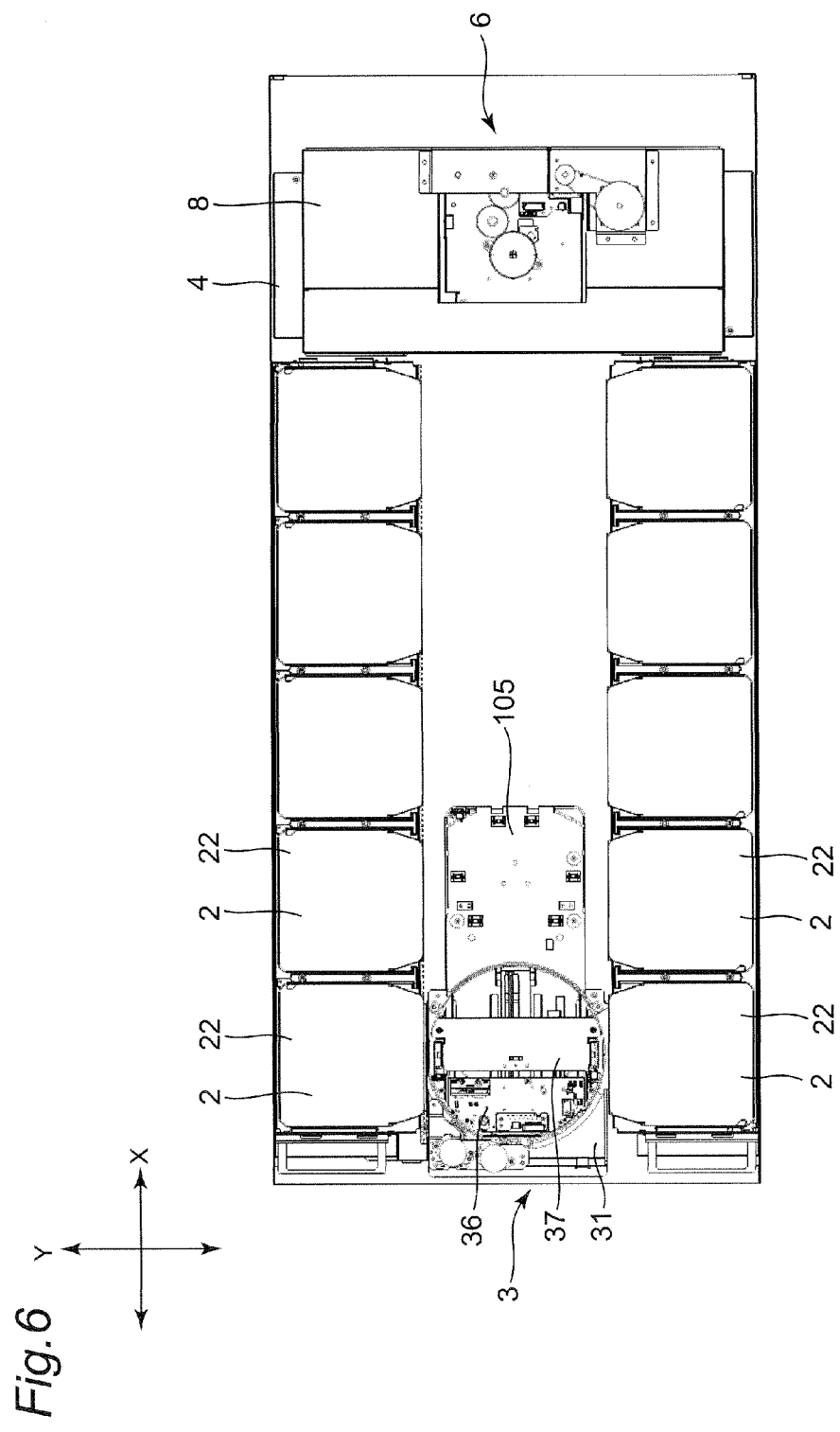
FIG. 6 is a plan view showing the state where the picker shown in FIG. 3 shifts to the position at the front of the magazine selected from a plurality of magazines.
Figure 7:
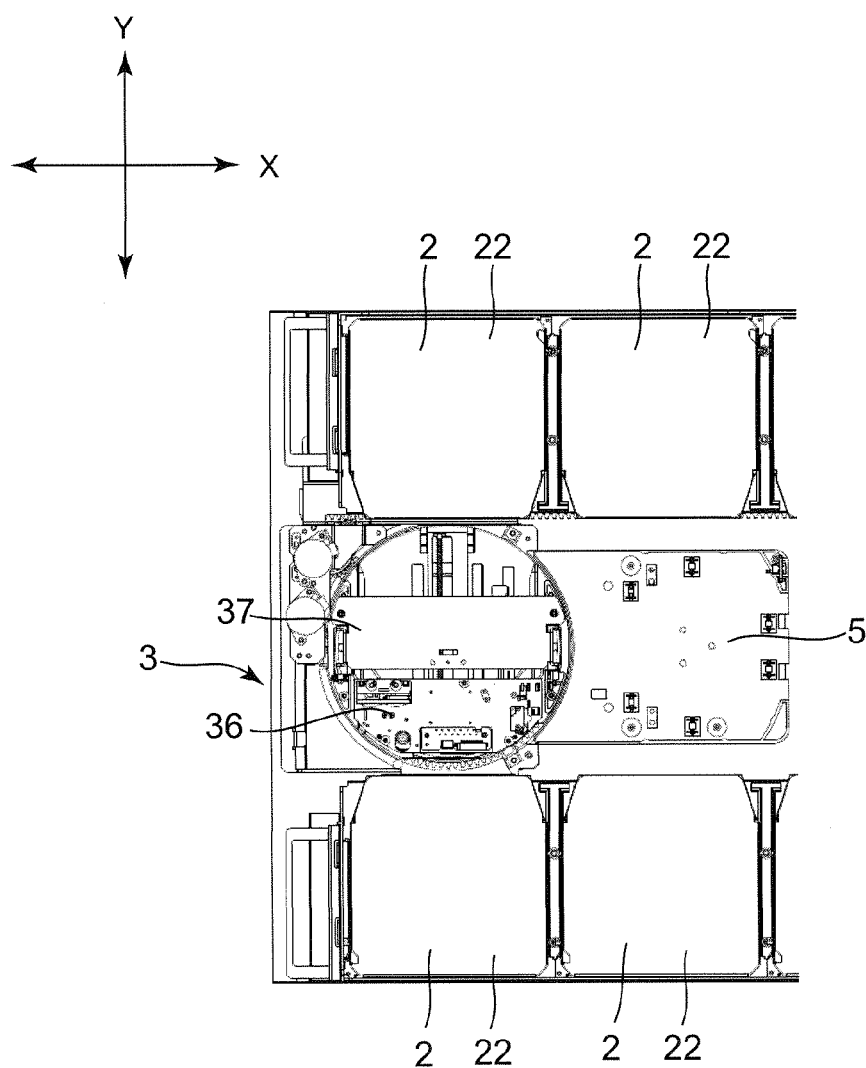
FIG. 7 is a plan view showing the manner of the picker shown in FIG. 3 drawing out a magazine tray from the magazine.

FIGS. 6 to 12 each show the manner of the picker 3 drawing out the magazine tray 21 from the case 22. As the run base 31 runs in the device depth direction X and the up-and-down table 34 rises and lowers in the device height direction Z along the pair of up-and-down rails 33, as shown in FIG. 6, the picker 3 shifts to the location at the front of one magazine 2 selected from a plurality of magazines 2. Further, as shown in FIG. 7, the rotary table 32 is rotated so that the chuck 36 is oriented to the front side of the magazine 2.

Figure 9:
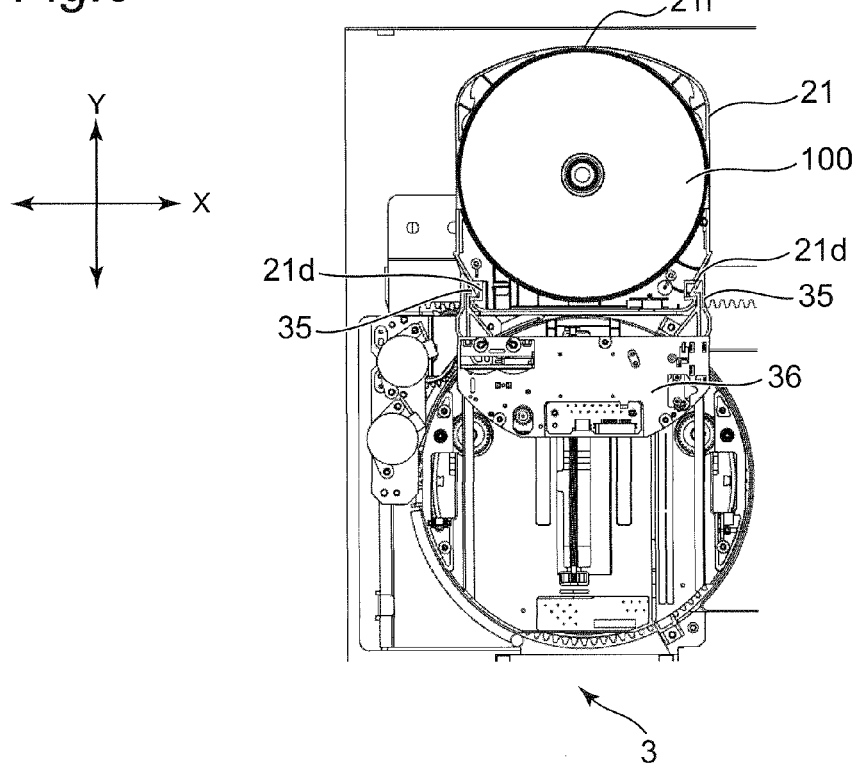
FIG. 9 is a plan view showing the manner of the picker shown in FIG. 3 drawing out the magazine tray from the magazine.

Thereafter, as shown in FIG. 8, the chuck 36 advances toward the magazine tray 21, whereby, as shown in FIG. 9, the pair of hooks 35, 35 is engaged with the engaging recess portions 21d, 21d of the magazine tray 21. In this state, by the chuck 36 receding from the case 22, the magazine tray 21 is drawn out from the case 22.

Figure 10:
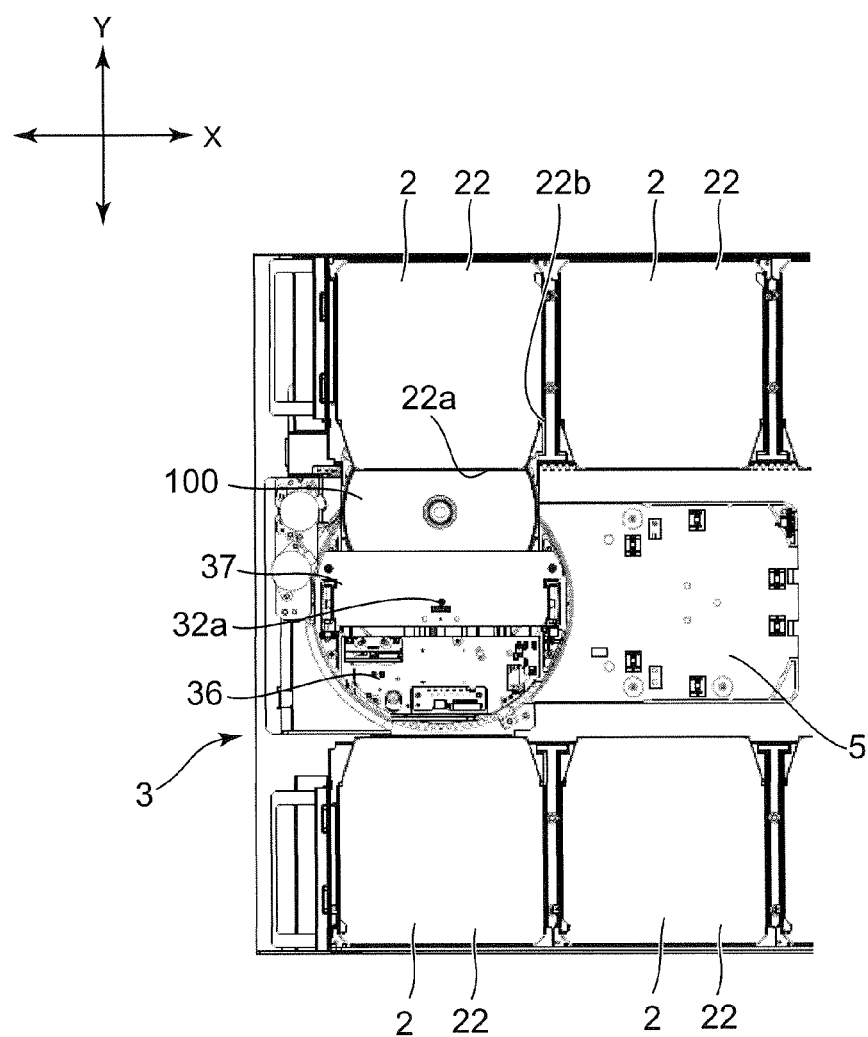
FIG. 10 is a plan view showing the manner of the picker shown in FIG. 3 drawing out the magazine tray from the magazine.
Figure 11:
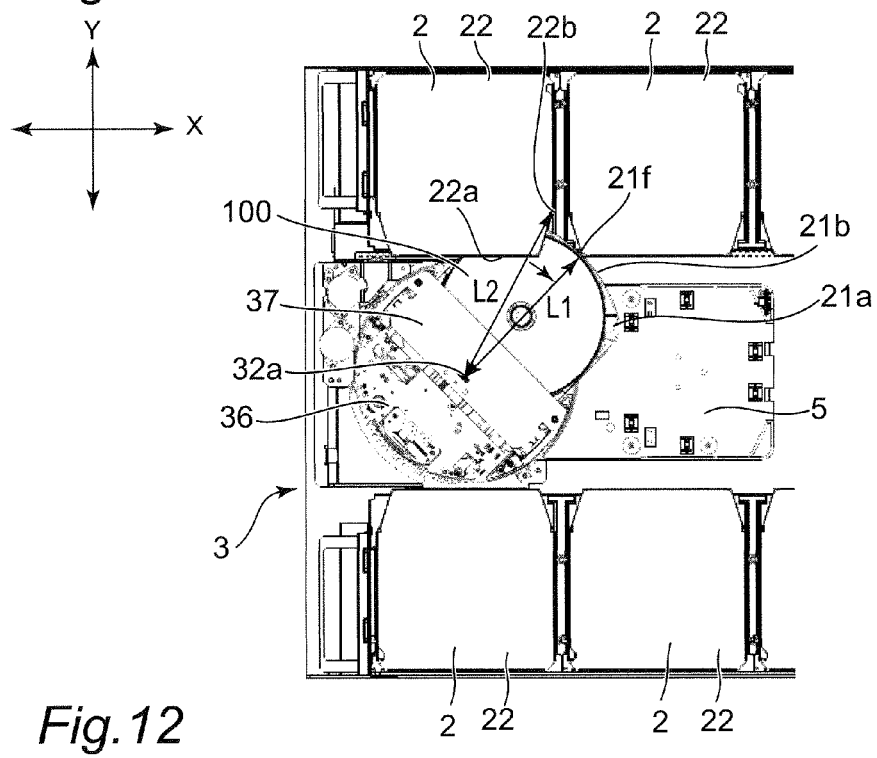
FIG. 11 is a plan view showing the manner of the picker shown in FIG. 3 drawing out the magazine tray from the magazine.
Figure 12:
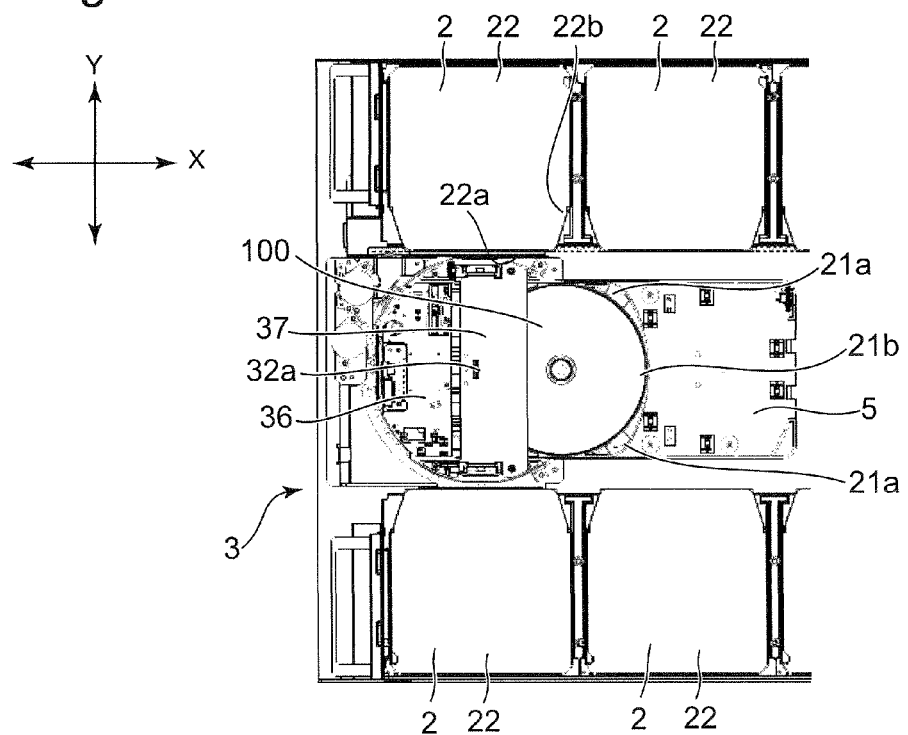
FIG. 12 is a plan view showing the state where the picker shown in FIG. 3 has drawn out the magazine tray from the magazine.

As shown in FIG. 10, by the chuck 36 receding (i.e., shifting to the location at the front of the case 22), after the cut portions 21a of the magazine tray 21 pass through the opening 22a of the case 22, the rotary table 32 rotates clockwise substantially about the rotation axis 32a. In other words, as shown in FIG. 11, when the distance L1 between a vertex 21f (i.e., the position farthest from the rotation axis 32a) of the side face 21b of the magazine tray 21 and the rotation axis 32a becomes smaller than the distance L2 between the front end portion 22b of the side face of the case 22 and the rotation axis 32a, the rotary table 32 rotates clockwise substantially about the rotation axis 32a. In accordance with the rotation of the rotary table 32, as shown in FIGS. 11 and 12, the magazine tray 21 rotates substantially about the rotation axis 32a. As a result, as shown in FIG. 12, the magazine tray 21 is completely drawn out from the case 22.

Figure 13:
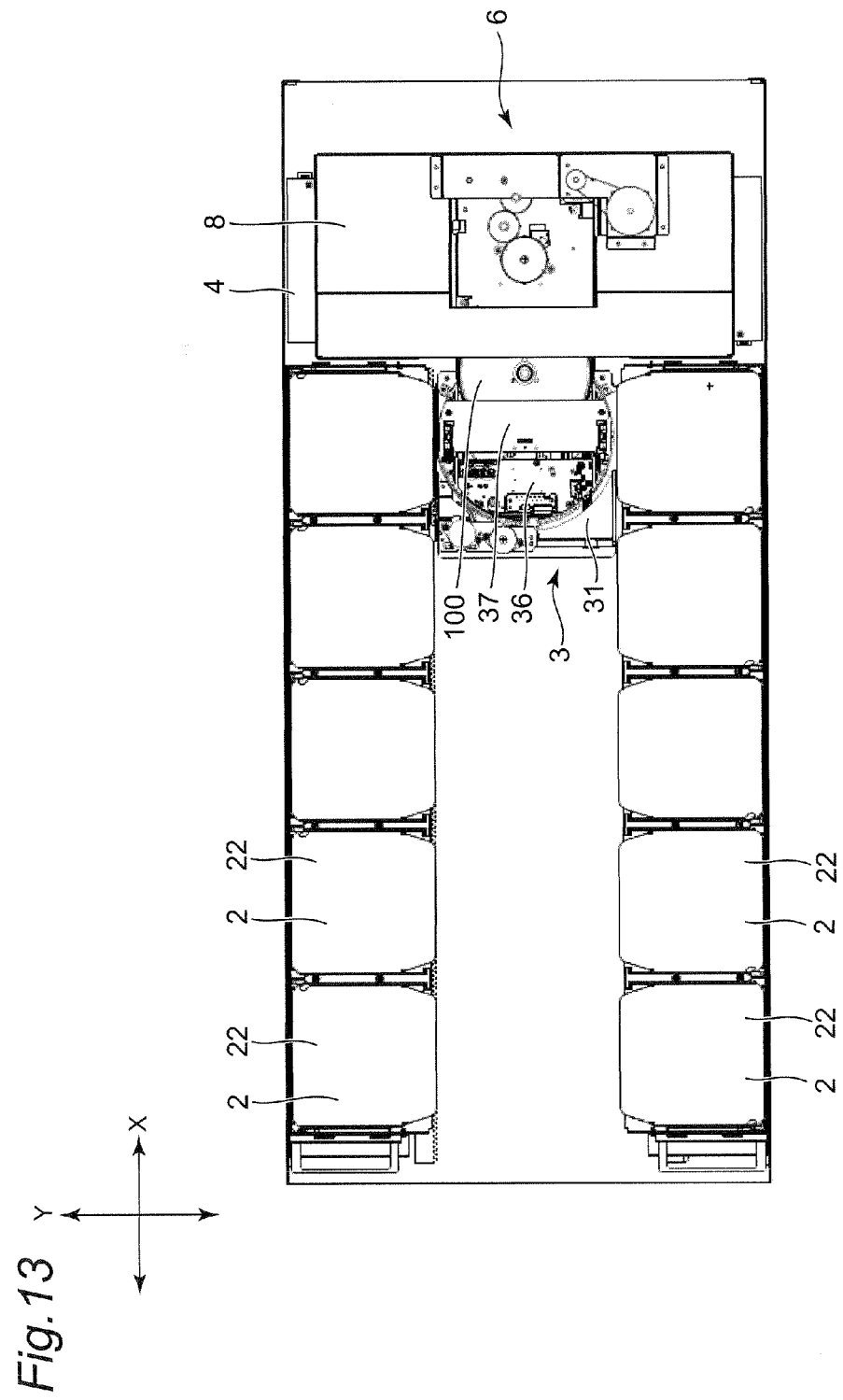
FIG. 13 is a plan view showing the state where the picker shown in FIG. 3 has conveyed the magazine tray to a position near the plurality of disc drives.
Figure 14:
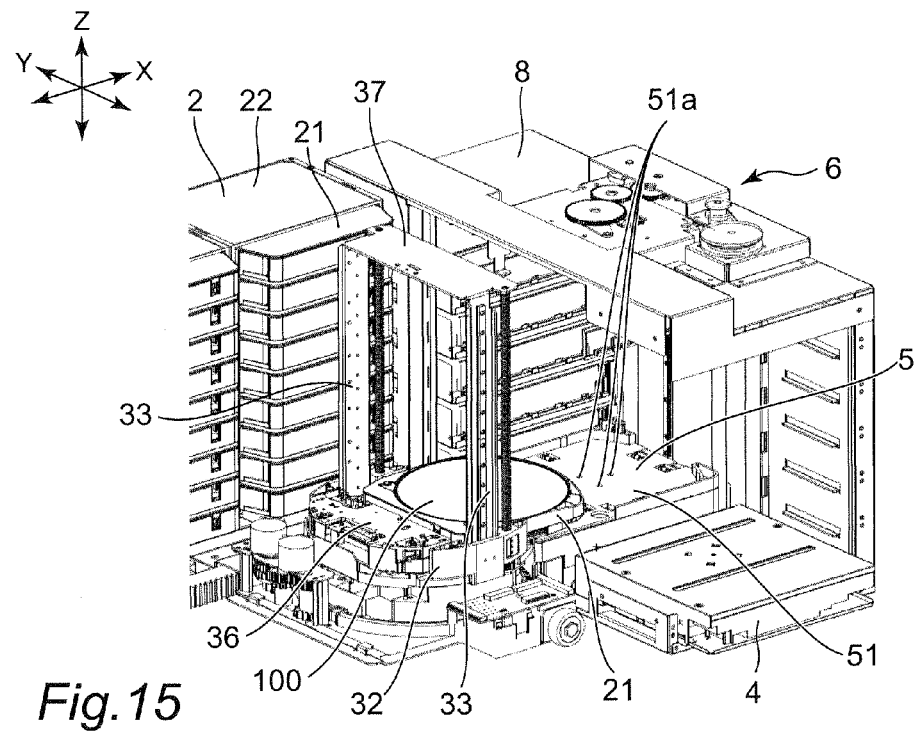
FIG. 14 is a perspective view showing the state where the picker shown in FIG. 3 has conveyed the magazine tray to a position near the plurality of disc drives.
Figure 15:
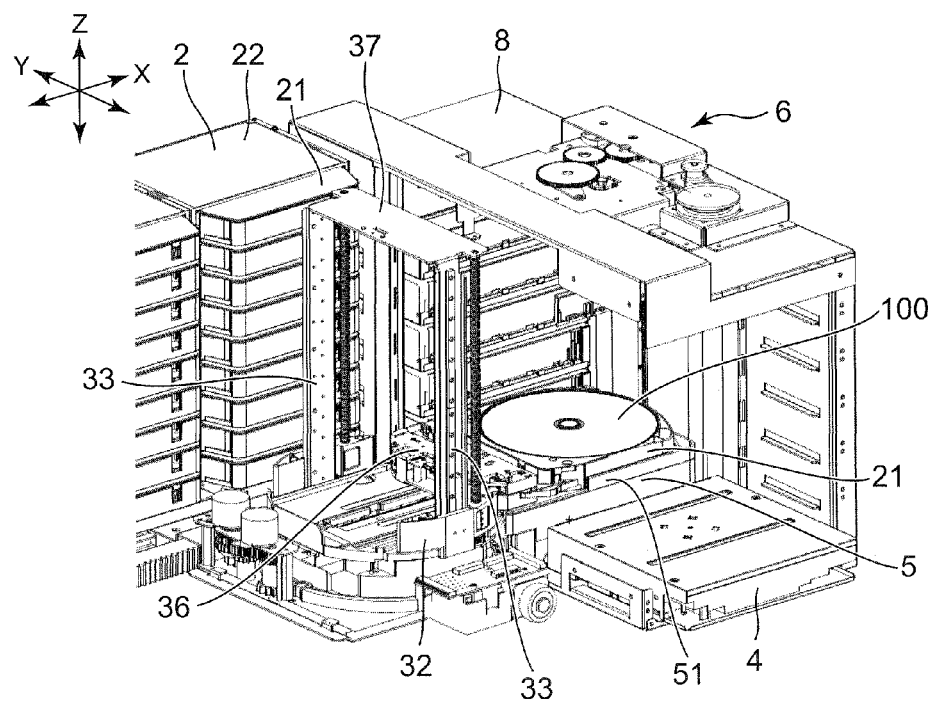
FIG. 15 is a perspective view showing the state where the picker shown in FIG. 3 has shifted the magazine tray to a position above a lifter included in the disc device shown in FIG. 1.

As shown in FIG. 12, the magazine tray 21 drawn out from the case 22 is conveyed to the location near the plurality of disc drives 4 as shown in FIGS. 13 and 14, by the run base 31 of the picker 3 running to the device-rear side. Thereafter, as shown in FIG. 15, the chuck 36 of the picker 3 advances, and the magazine tray 21 is placed at a prescribed position on the magazine tray guide 51 at the top of the lifter 5. It is to be noted that, the disc drives 4 on the near side are not shown in FIGS. 14 and 15. Similarly, the disc drives 4 on the near side are not shown also in FIGS. 21 to 28, which will be referred to later.

Figure 16:
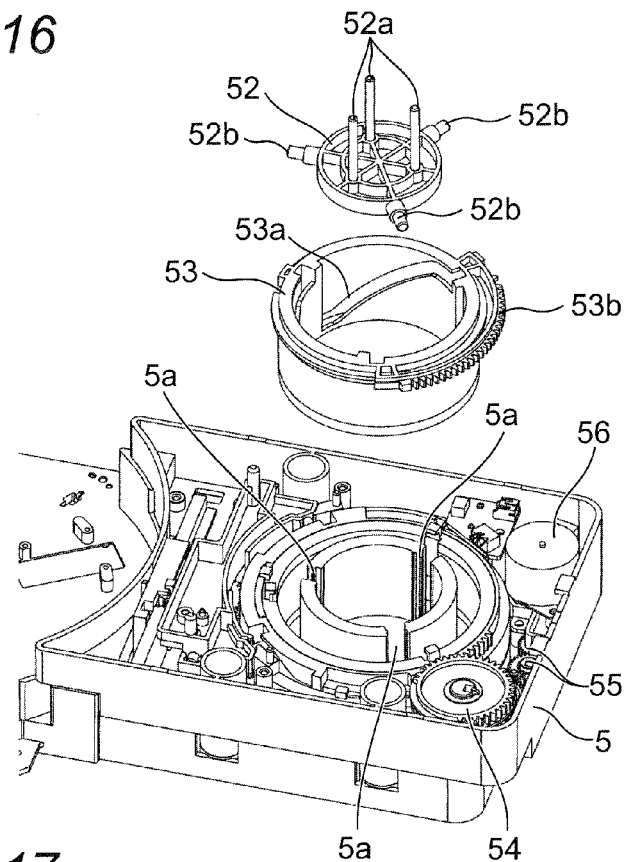
FIG. 16 is an exploded perspective view showing the state where a magazine tray guide of the lifter included in the disc device shown in FIG. 1 is removed.
Figure 17:
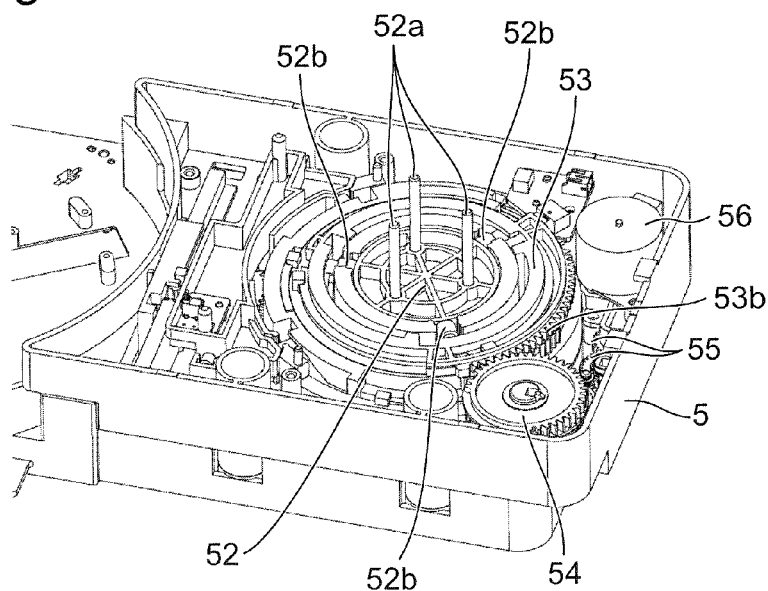
FIG. 17 is an assembly perspective view showing the state where the magazine tray guide of the lifter included in the disc device shown in FIG. 1 is removed.

FIG. 16 is an exploded perspective view showing the state where the magazine tray guide 51 of the lifter 5 is taken out, and FIG. 17 is an assembly perspective view thereof.

As shown in FIGS. 16 and 17, the lifter 5 includes an up-and-down plate 52, a rotary cam 53, a drive gear 54, a relay gear 55, and a lifter motor 56.

The up-and-down plate 52 includes up-and-down pins 52*a* each being an exemplary rod-like member, and cam pins 52*b*. In the present embodiment, the three up-and-down pins 52*a* are provided at an interval of 120 degrees, and so are the three cam pins 52*b*.

The three up-and-down pins 52*a* are provided at positions where they agree with the three holes 21*e* provided at the magazine tray 21 as shown in FIG. 2B, when the magazine tray 21 is placed at the prescribed position on the magazine tray guide 51 as shown in FIG. 15. Further, as shown in FIG. 14, the magazine tray guide 51 is provided with three holes 51*a* at the positions corresponding to the three up-and-down pins 52*a*. The three cam pins 52*b* are engaged with three slits 5*a* provided at the body of the lifter 5. The slits 5*a* are provided so as to extend in the device height direction Z.

Three cam grooves 53*a* are provided at the inner circumferential face of the rotary cam 53. Each cam groove 53*a* has an inclined face along which the tip portion of corresponding one of the three cam pins 52*b* slides. A cam gear 53*b* is provided at the outer circumferential face of the rotary cam 53. The cam gear 53*b* meshes with the drive gear 54. The drive gear 54 meshes with the relay gear 55. The relay gear 55 meshes with the motor gear (not shown), into which the drive shaft of the lifter motor 56 is press fitted.

When the lifter motor 56 is driven, the drive force of the lifter motor 56 is transferred to the drive gear 54 via the motor gear (not shown) and the relay gear 55, whereby the drive gear 54 rotates. Thus, the rotary cam 53 meshing with the drive gear 54 by the cam gear 53*b* rotates. As the rotary cam 53 rotates, tip portions of the three cam pins 52*b*, whose rotation is regulated by the three slits 5*a*, slide along the inclined face of the three cam grooves 53*a*, and the up-and-down plate 52 rises and lowers in the device height direction Z. The lifter motor 56 is connected to the control unit of the electric circuit and the power supply 7 via the FFC 14 (see FIG. 1), and drives under control of the control unit.

As shown in FIG. 17, when the up-and-down plate 52 rises, the three up-and-down pins 52*a* enter inside the magazine tray 21 through the three holes 51*a* of the magazine tray guide 51 and the three holes 21*e* of the magazine tray 21. By the rising of the three up-and-down pins 52*a*, a plurality of discs 100 are pushed out from the magazine tray 21. The plurality of discs 100 pushed out by the three up-and-down pins 52*a* are retained by the carrier 6.

Figure 18:
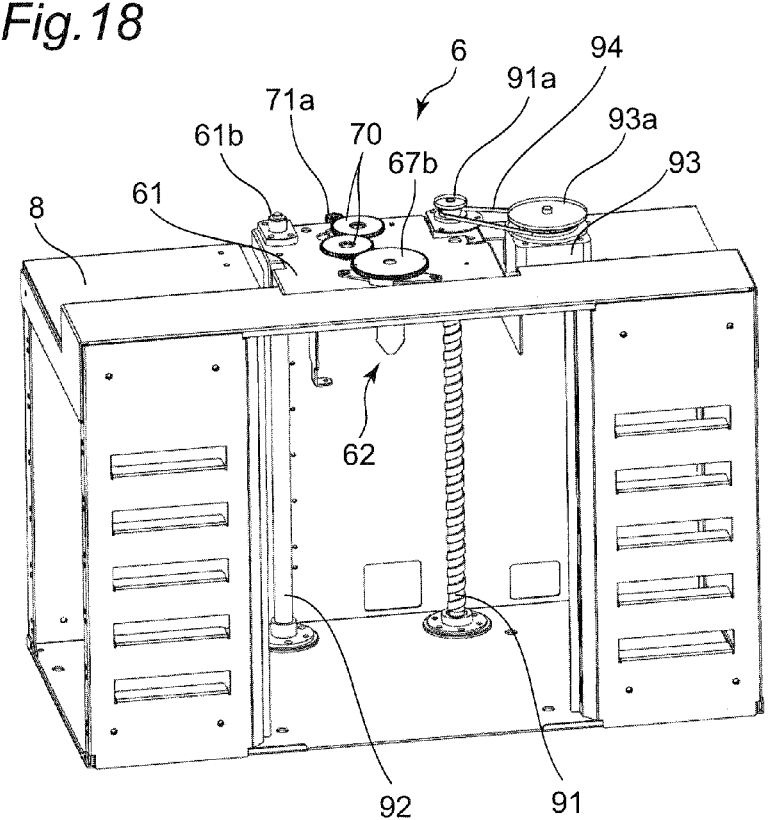
FIG. 18 is a perspective view of a carrier included in the disc device shown in FIG. 1.

As shown in FIG. 18, the carrier 6 is provided at a housing 8 storing a plurality of (e.g., 12 pieces of) disc drives 4. The carrier 6 includes a shift base 61 shifting in the device height direction Z and a disc chuck unit 62 provided at the shift base 61.

Figure 19:
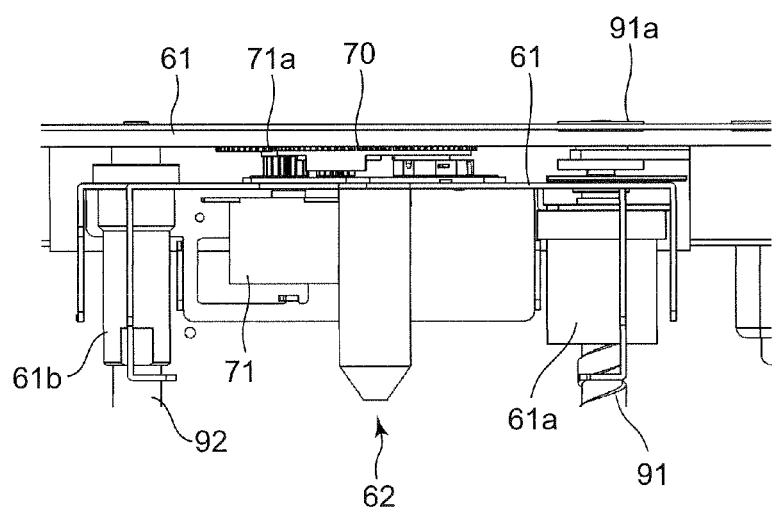
FIG. 19 is a partial enlarged side view of the carrier shown in FIG. 18.

As shown in FIG. 19, the shift base 61 is connected to a ball screw 91 via a bush 61*a* and connected to a guide shaft 92 via a guide shaft bearing 61*b*. The ball screw 91 and the guide shaft 92 are provided so as to extend in the device height direction Z.

As shown in FIG. 18, a pulley 91*a* is attached to the top end portion of the ball screw 91. Further, the housing 8 is provided with a carrier motor 93 that produces the drive force for rotating the ball screw 91 about its axis. A pulley 93*a* is attached to the drive shaft of the carrier motor 93. A belt 94 is wrapped around the pulley 91*a* and the pulley 93*a*.

When the carrier motor 93 is driven, the drive force of the carrier motor 93 is transferred to the ball screw 91 via the pulley 93*a*, the belt 94, and the pulley 91*a*, and the ball screw 91 rotates about its axis. By the rotation of the ball screw 91, the shift base 61 is guided by the ball screw 91 and the guide shaft 92 and shifts in the device height direction Z. The carrier motor 93 is connected to the control unit of the electric circuit and the power supply 7, and drives under control of the control unit.

The disc chuck unit 62 is structured to retain a plurality of discs 100 pushed out by the lifter 5, and to separate the retained plurality of discs 100 one by one. The detail of the structure of the shift base 61 and the disc chuck unit 62 will be detailed later.

Figure 20:
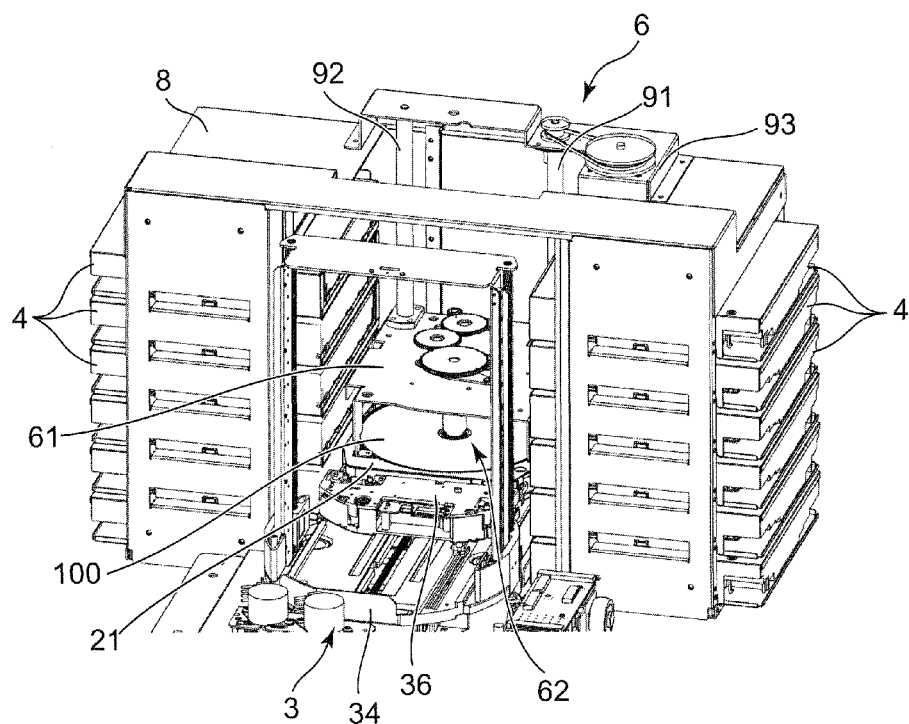
FIG. 20 is a perspective view showing the state where a disc chuck unit included in the carrier shown in FIG. 18 is lowered to a position above and near the magazine tray.
Figure 21:
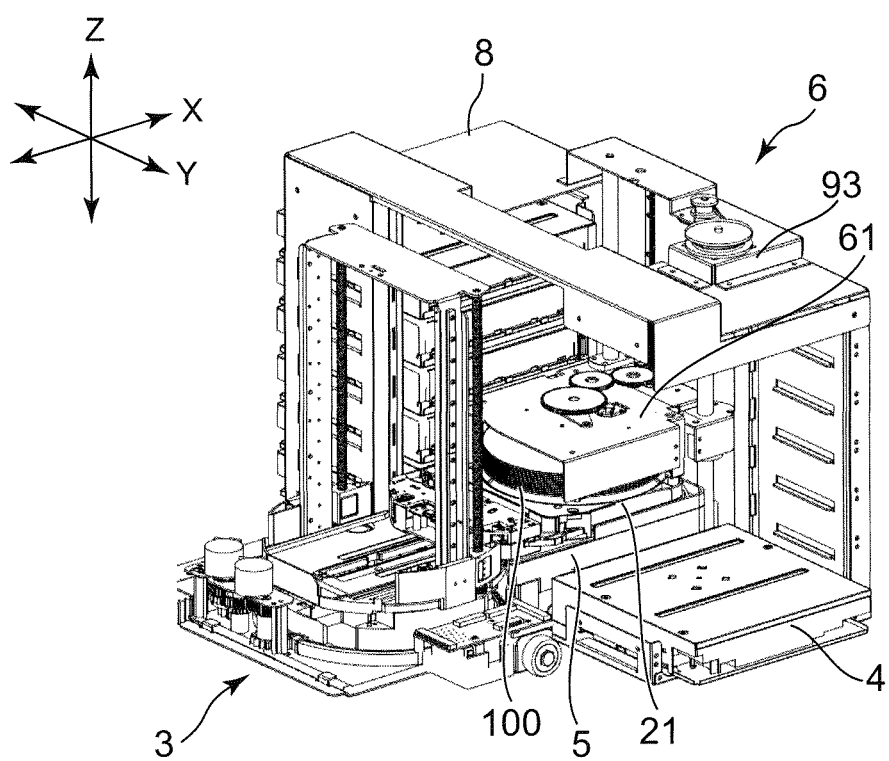
FIG. 21 is a perspective view showing the state where all the discs are held by the disc chuck unit.

As shown in FIG. 15, when the magazine tray 21 is placed at a prescribed position at the top of the lifter 5, as shown in FIG. 20, the shift base 61 is lowered to the position near the magazine tray 21. Thus, the tip portion of the disc chuck unit 62 engages with the engaging portion 23*a* of the core rod 23 (see FIG. 2B) provided at the magazine tray 21, whereby the disc chuck unit 62 and the core rod 23 become coaxial to each other. In this state, the lifter motor 56 is driven and the up-and-down plate 52 rises (see FIG. 17).

When the up-and-down plate 52 rises, the up-and-down pins 52*a* enter inside the magazine tray 21 through the holes 51*a* and 21*e*, to push out a plurality of discs 100 from the magazine tray 21. Thus, as show in FIG. 21, the disc chuck unit 62 retains the plurality of discs 100.

Figure 22:
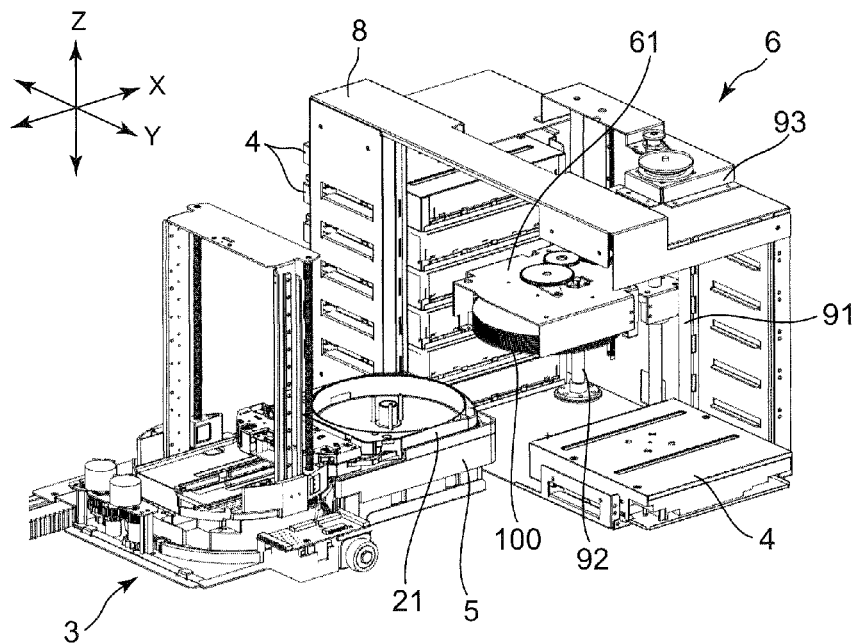
FIG. 22 is a perspective view showing the state, which follows the state shown in FIG. 21, where the picker has shifted to the device-front side, and the magazine tray has receded from the position near the disc drive.
Figure 23:
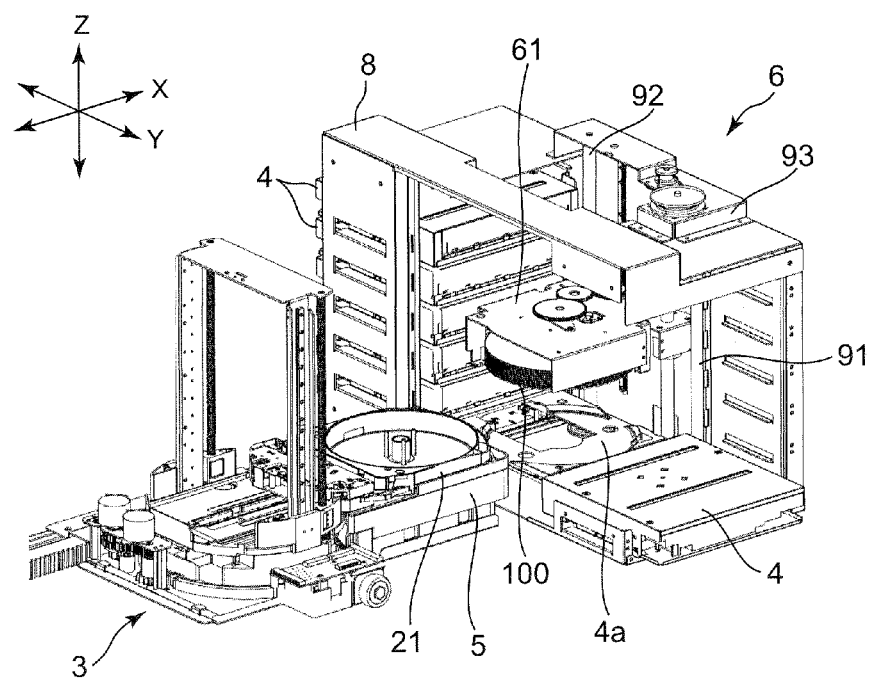
FIG. 23 is a perspective view showing the state, which follows the state shown in FIG. 22, where a tray of the bottommost-stage disc drive is ejected.

When the disc chuck unit 62 retains all the discs 100, the shift base 61 rises as being guided by the ball screw 91 and the guide shaft 92. Thus, engagement between the tip portion of the disc chuck unit 62 and the engaging portion 23*a* of the core rod 23 (see FIG. 2B) is released. Thereafter, as shown in FIG. 22, the picker 3 shifts to the device-front side, and the magazine tray 21 recedes from the location near the disc drive 4. Thereafter, under control of the control unit of the electric circuit and the power supply 7, the tray 4*a* of the disc drive 4 is ejected as shown in FIG. 23.

Figure 24:
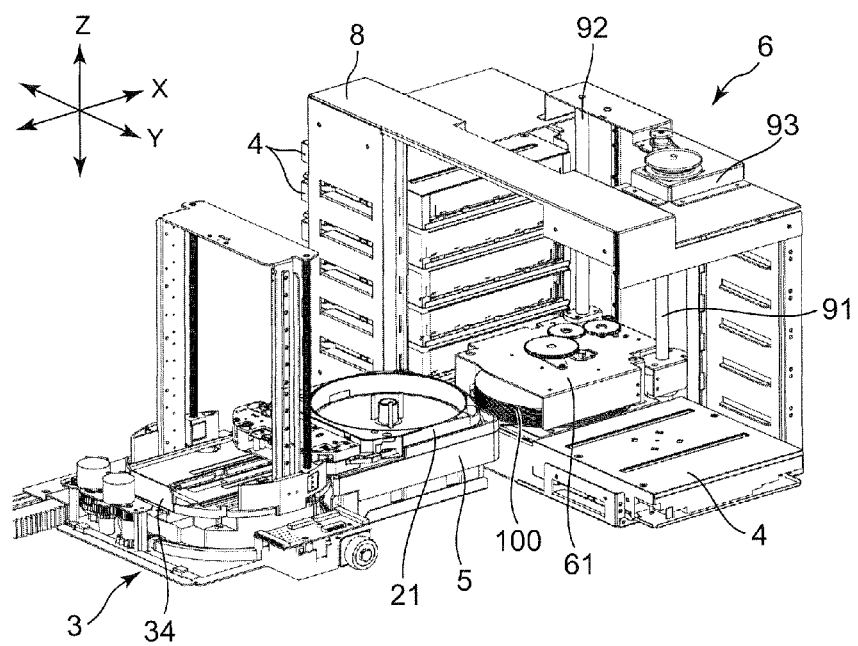
FIG. 24 is a perspective view showing the state, which follows the state shown in FIG. 23, where a shift base is lowered such that the plurality of discs retained by the disc chuck unit position above the tray.
Figure 25:
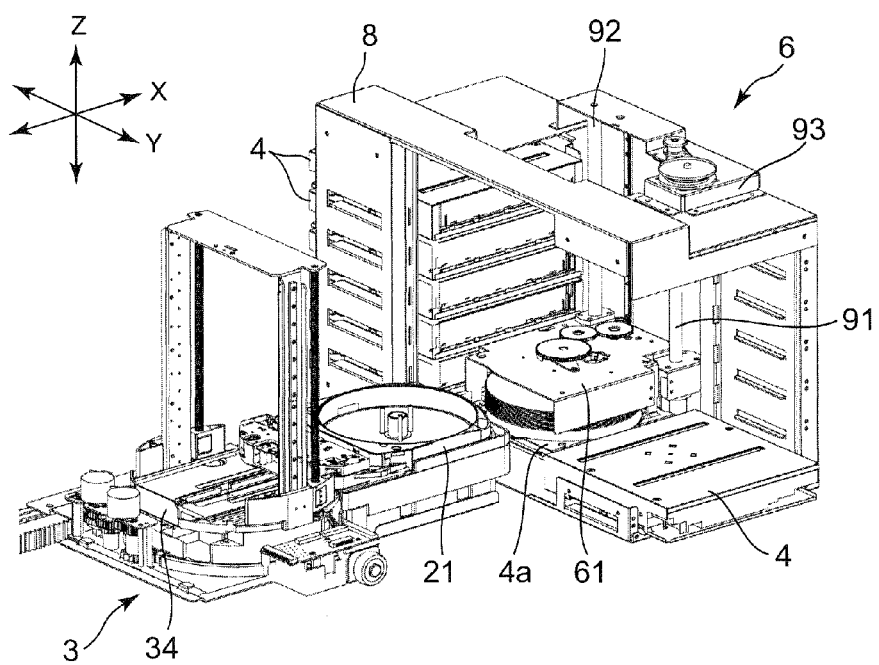
FIG. 25 is a perspective view showing the state where the bottommost disc is placed on the tray.

Thereafter, as shown in FIG. 24, the shift base 61 is lowered such that the plurality of discs 100 retained by the disc chuck unit 62 are located above the tray 4*a* (e.g., immediately above). Thereafter, by the disc chuck unit 62, the bottommost disc 100 is separated from the other discs, and placed on the tray 4*a*. FIG. 25 is a perspective view showing the state where the bottommost disc 100 is placed on the tray 4*a*.

Figure 26:
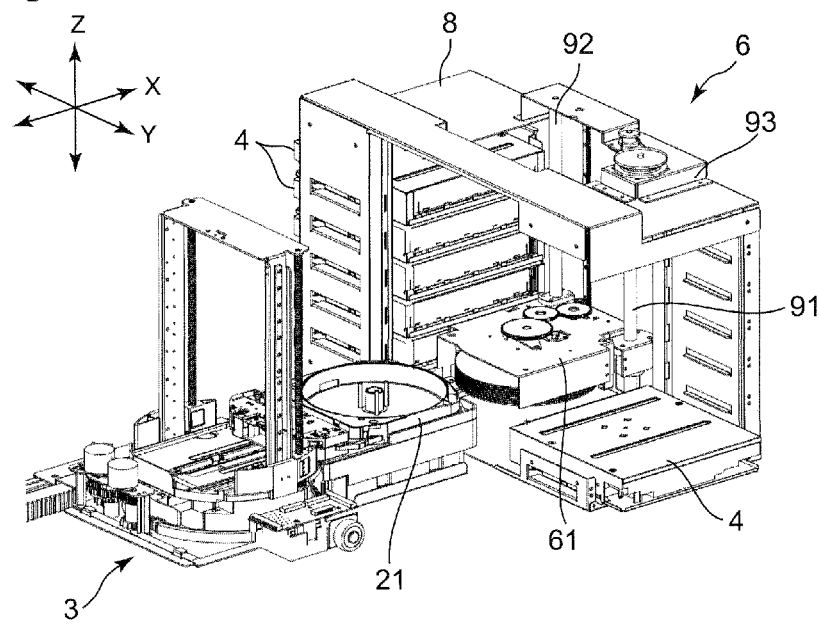
FIG. 26 is a perspective view showing the state, which follows the state shown in FIG. 25, where the tray has been carried into the disc drive.

When the bottommost disc 100 is placed on the tray 4*a*, the shift base 61 is raised such that the disc chuck unit 62 and the tray 4*a* are not brought into contact with each other. Thereafter, as shown in FIG. 26, the tray 4*a* is carried into the disc drive 4. Thereafter, or simultaneously therewith, the tray 4*a* of the disc drive 4 opposing to the handled disc drive is ejected (not shown). Thereafter, in the manner similarly to that described above, a disc 100 is placed on the tray 4*a*, and the tray 4*a* is carried into the disc drive 4. Thus, the loading operation as to the disc drives 4 of the bottommost stage (first stage) is completed. This loading operation is repeated as to the second and following stages.

Figure 27:
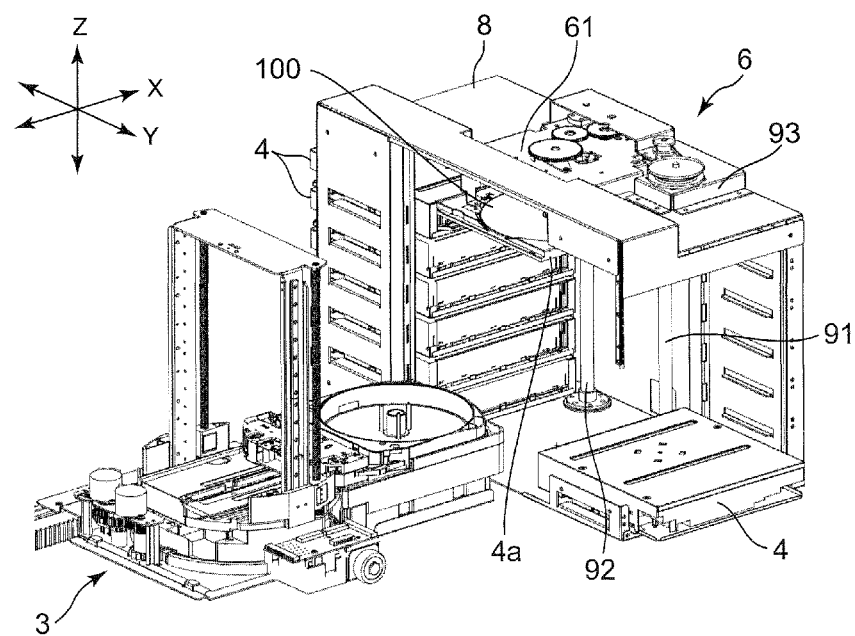
FIG. 27 is a perspective view where the carrier places a disc on the tray of the topmost-stage disc drive.

FIG. 27 shows the manner in which a disc 100 is placed on the tray 4*a* of the disc drive 4 of the topmost stage (e.g., sixth stage). When the loading operation as to the topmost-stage disc drives 4 is completed, all the disc drives 4 now accommodate the discs 100, and recording on or reproduction from the discs 100 in the disc drives 4 is enabled.

It is to be noted that, the collection of the discs 100 in the disc drives 4 should be performed in the order reverse to the foregoing manner, for example. Specifically, it is performed as follows.

Firstly, as shown in FIG. 27, the tray 4*a* of the topmost-stage disc drive 4 is ejected.

Thereafter, the disc chuck unit 62 is inserted into the center hole 100a of the disc 100 on the tray 4a, and the disc chuck unit 62 retains the disc 100.

Thereafter, the tray 4a from which the disc 100 is collected by the disc chuck unit 62 is carried into the disc drive 4. Thereafter or simultaneously therewith, the tray 4a of the disc drive 4 opposing to the handled disc drive is ejected (not shown). Thereafter, in the manner similarly to that described above, the disc 100 of the tray 4a is collected by the disc chuck unit 62, and the tray 4a is carried into the disc drive 4. Thus, the disc collection operation as to the disc drives 4 of the topmost stage (first stage) is completed. This disc collection operation is repeated until the discs 100 in the bottommost-stage disc drives 4 are collected.

When the disc chuck unit 62 has collected all the discs 100, the shift base 61 is raised. Thereafter, the picker 3 shifts to the device-rear side, and the magazine tray 21 is set below the disc chuck unit 62.

Thereafter, the shift base 61 is lowered, and the tip portion of the disc chuck unit 62 engages with the engaging portion 23a (see FIG. 2B) of the core rod 23, whereby the disc chuck unit 62 and the core rod 23 become coaxial to each other.

Figure 28:
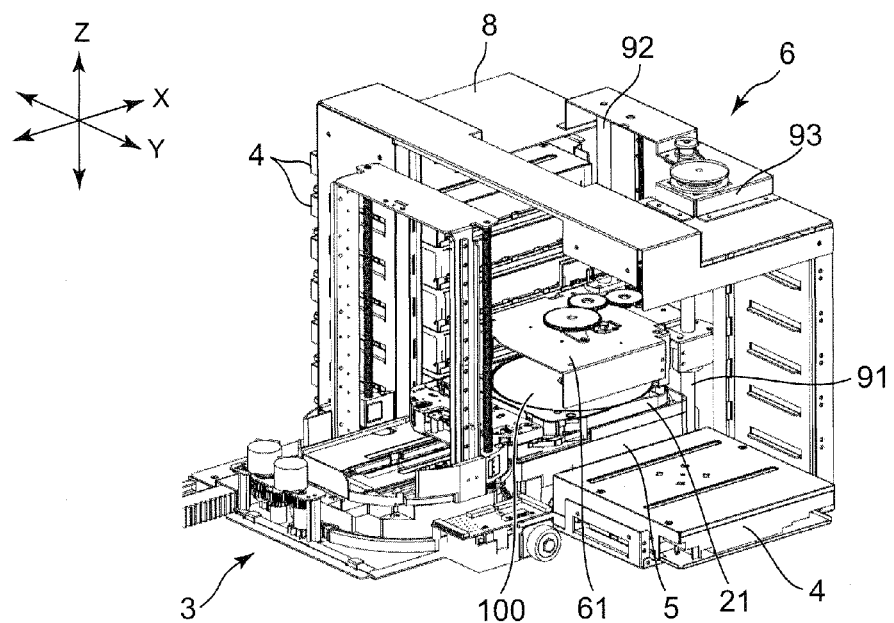
FIG. 28 is a perspective view showing the state where a plurality of discs collected by the carrier are stored in the magazine tray.

Thereafter, all the discs 100 retained by the disc chuck unit 62 are pushed into the magazine tray 21 as shown in FIG. 28, and stored.

Thereafter, the shift base 61 is raised, and the engagement between the tip portion of the disc chuck unit 62 and the engaging portion 23a of the core rod 23 is released.

The magazine tray 21 having stored all the discs 100 are returned into the magazine stocker 1 by the picker 3. This conveyance of the magazine tray 21 into the magazine stocker 1 is achieved by, for example, performing the operations that are reverse to the operations having been described with reference to FIGS. 6 to 15.

Next, a more detailed description will be given of the structure of the disc chuck unit 62.

Figure 29:
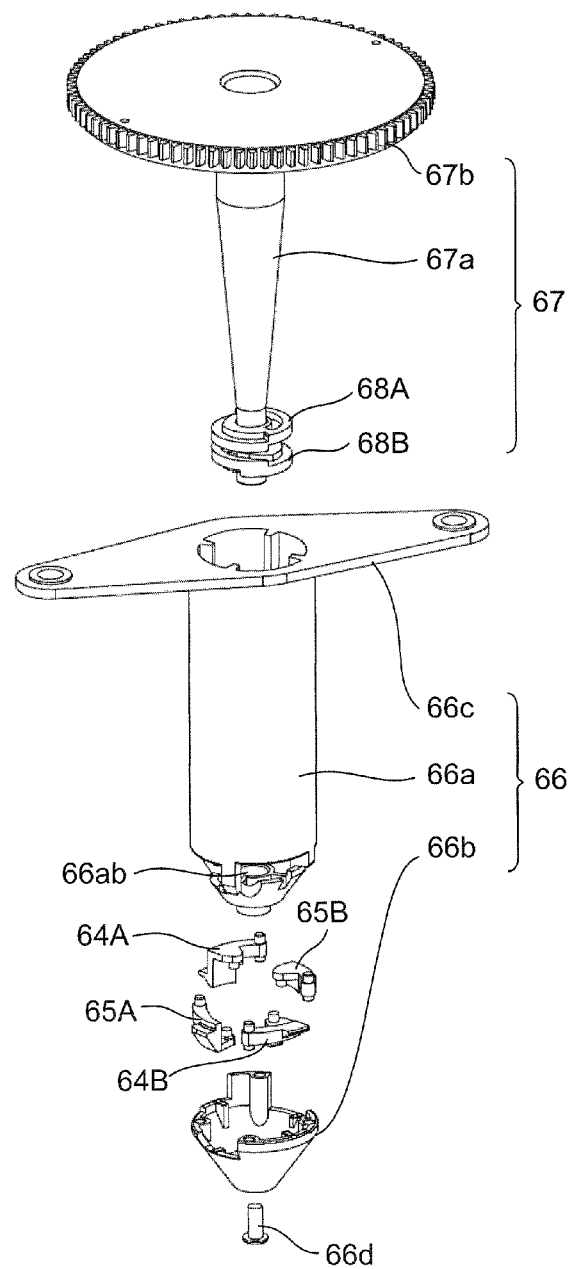
FIG. 29 is an exploded perspective view of the disc chuck unit included in the carrier shown in FIG. 18 as seen diagonally from above.
Figure 30:
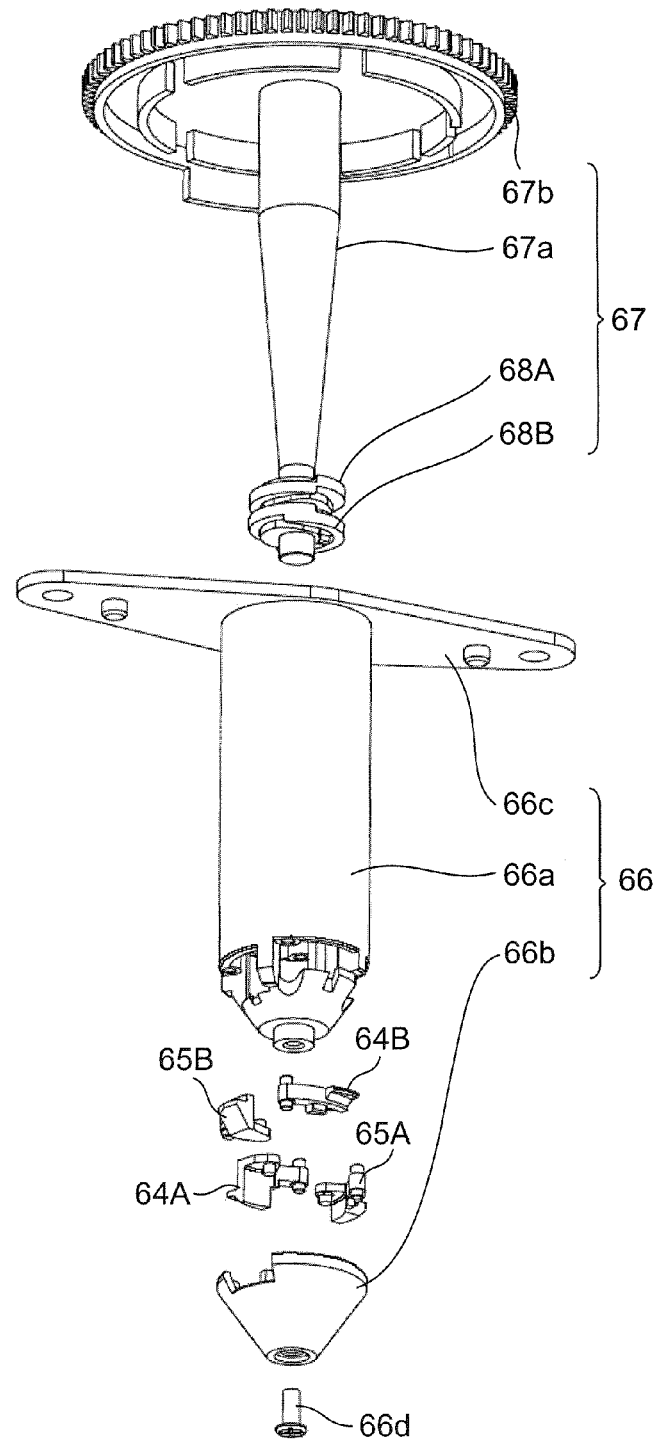
FIG. 30 is an exploded perspective view of the disc chuck unit included in the carrier shown in FIG. 18 as seen diagonally from below.

As shown in FIGS. 29 and 30, the disc chuck unit 62 includes separator hooks 64A, 64B, bottom hooks 65A, 65B, a spindle unit 66, and a camshaft unit 67.

Figure 31:
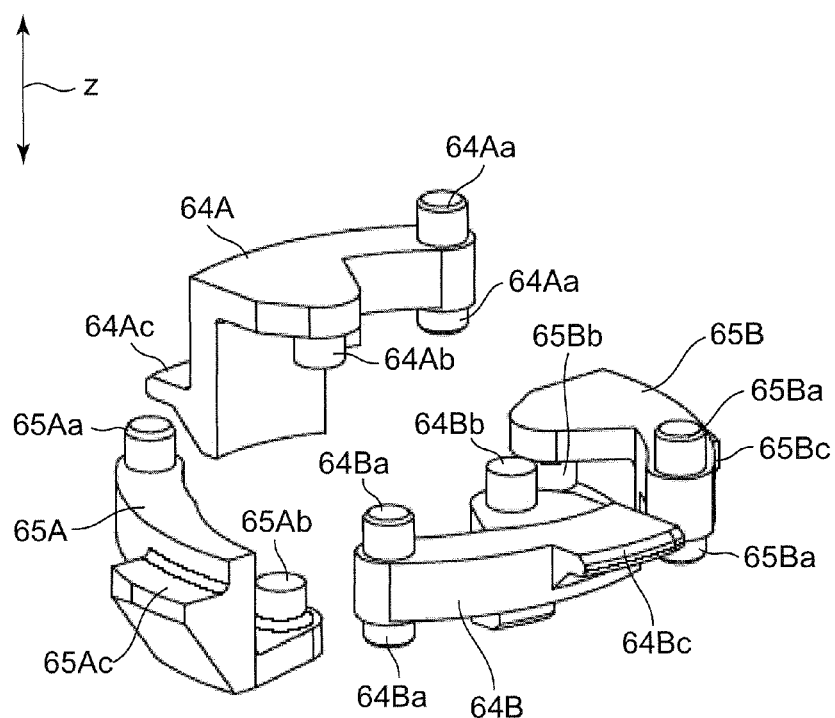
FIG. 31 is an enlarged perspective view of two separator hooks and two bottom hooks included in the disc chuck unit shown in FIG. 29.

FIG. 31 is an enlarged perspective view of the separator hooks 64A, 64B and the bottom hooks 65A, 65B. The hooks 64A to 65B are formed to be substantially lever-shaped, and include rotary shafts 64Aa to 65Ba and drive pins 64Ab to 65Bb extending in the device height direction Z, and claw portions 64Ac to 65Bc projecting in the direction crossing the device height direction Z.

Figure 32:
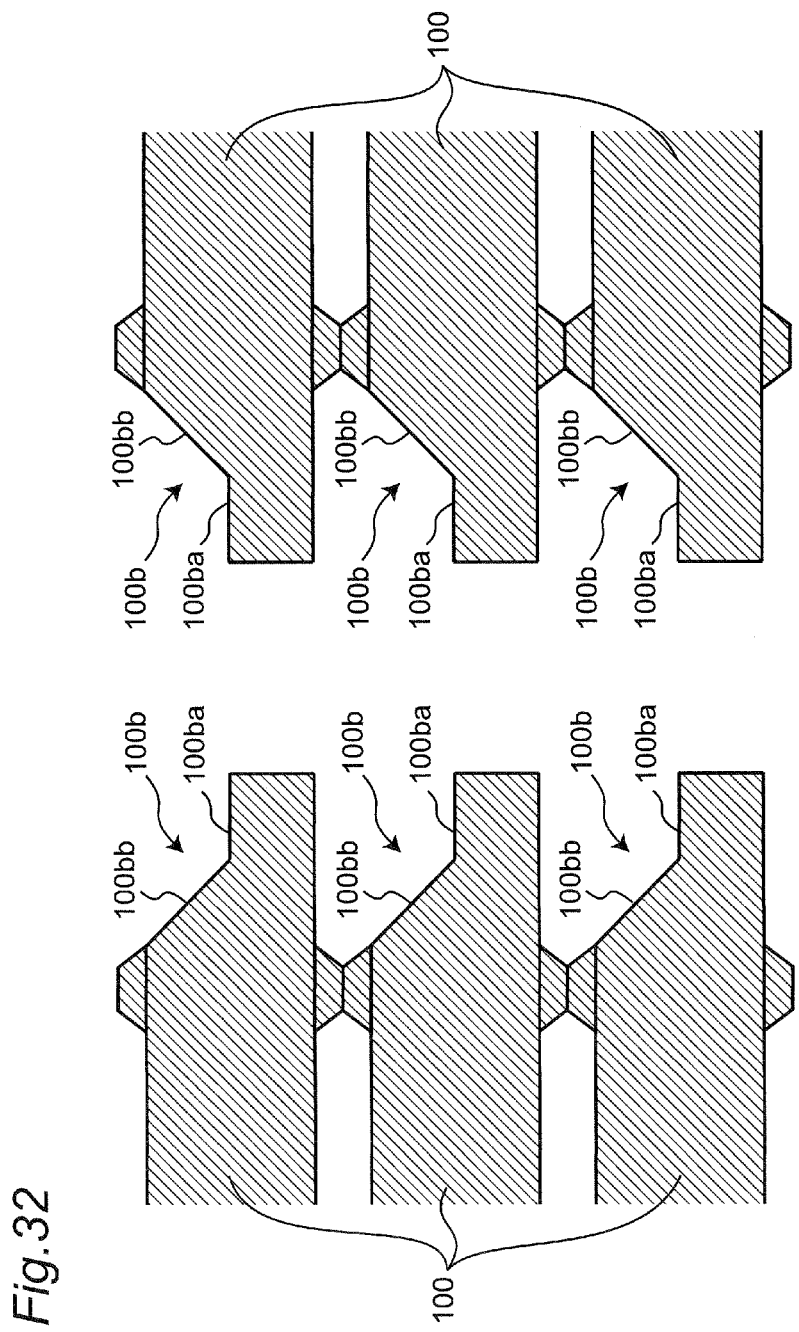
FIG. 32 is a cross sectional view showing the discs each provided with a recess portion at their inner circumferential portion.

Further, as shown in FIG. 32, in the present embodiment, the inner circumferential portion of each disc 100 is provided with a recess portion 100b. The recess portion 100b is formed to have a shape obtained by cutting the top corner portion of the inner circumferential portion of the disc 100 so as to have a level face 100ba and an inclined face 100bb. As shown in FIG. 31, the bottom faces of the claw portions 64Ac, 64Bc of the separator hooks 64A, 64B are each formed to have an inclined face, such that the thickness becomes greater downward from the outer circumferential side to the inner circumferential side. Further, the top faces of the claw portions 64Ac to 65Bc are formed to be perpendicular to the device height direction Z.

As shown in FIGS. 29 and 30, the spindle unit 66 includes a spindle shaft 66a of a substantially cylindrical shape, a spindle head 66b of a substantially circular truncated cone shape provided below the spindle shaft 66a, and a flange 66c provided at the top end portion of the spindle shaft 66a.

By the flange 66c being directly or indirectly attached to the shift base 61, the spindle unit 66 shifts integrally with the shift base 61. The diameter of the spindle shaft 66a is set to be smaller than the diameter of the center hole 100a of each disc 100. For example, the diameter of the spindle shaft 66a is 14.5 mm, and the diameter of the center hole 100a of the disc 100 is 15 mm.

Figure 33:
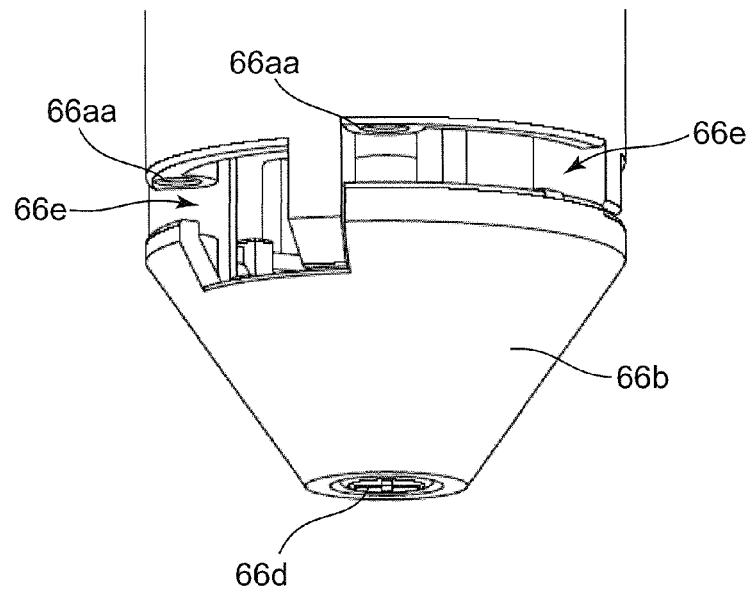
FIG. 33 is a perspective view showing the state where a spindle head included in the disc chuck unit shown in FIG. 29 is fixed to the bottom end portion of a spindle shaft by a screw.

As shown in FIG. 33, the spindle head 66b is fixed to the bottom end portion of the spindle shaft 66a by a screw 66d. Between the spindle head 66b and the spindle shaft 66a, four openings 66e are formed. The claw portions 64Ac to 65Bc of the hooks 64A to 65B are structured so as to be capable of advancing and retracting through the openings 66e.

Figure 34:
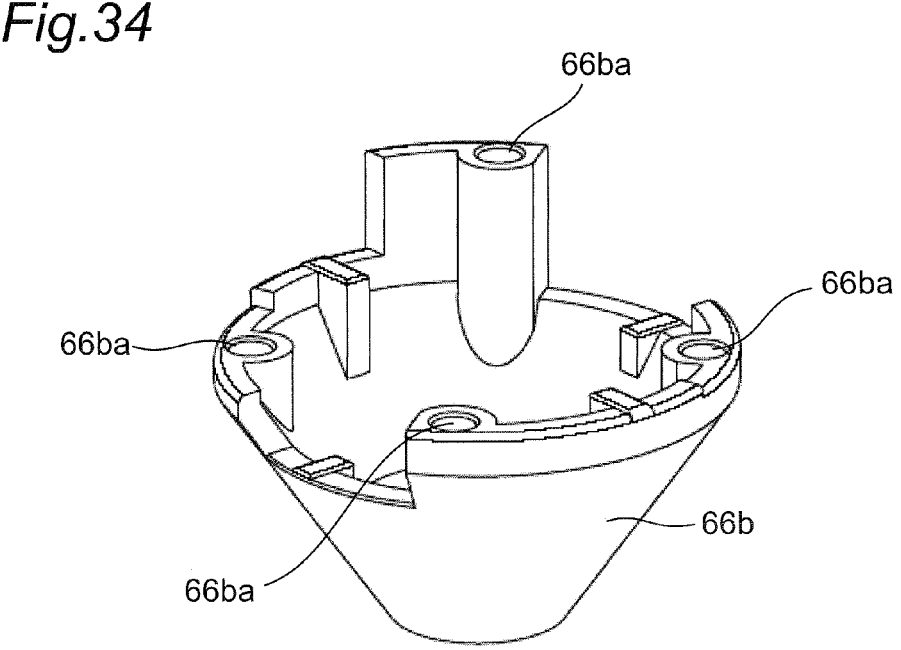
FIG. 34 is a perspective view of the spindle head included in the disc chuck unit shown in FIG. 29.

As shown in FIG. 34, the spindle head 66b is provided with four rotary shaft holes 66ba. Further, as shown in FIG. 33, the spindle shaft 66a is provided with rotary shaft holes 66aa at the positions corresponding to the positions opposing to the rotary shaft holes 66ba. The hooks 64A to 65B are rotatably retained, by the rotary shafts 64Ac to 65Bc being inserted into corresponding rotary shaft holes 66aa, 66ba. Further, the hooks 64A to 65B are retained such that the top faces of the claw portions 64Ac, 64Bc of the separator hooks 64A, 64B are positioned higher than the top faces of the claw portions 65Ac, 65Bc of the bottom hooks 65A, 65B by the thickness of approximately one disc. Further, the separator hook 64A and the separator hook 64B are retained at the positions being out of phase by 180 degrees from each other in the circumferential direction of the spindle unit 66. The bottom hook 65A and the bottom hook 65B are retained at the positions being out of phase by 180 degrees from each other in the circumferential direction of the spindle unit 66.

Figure 35:
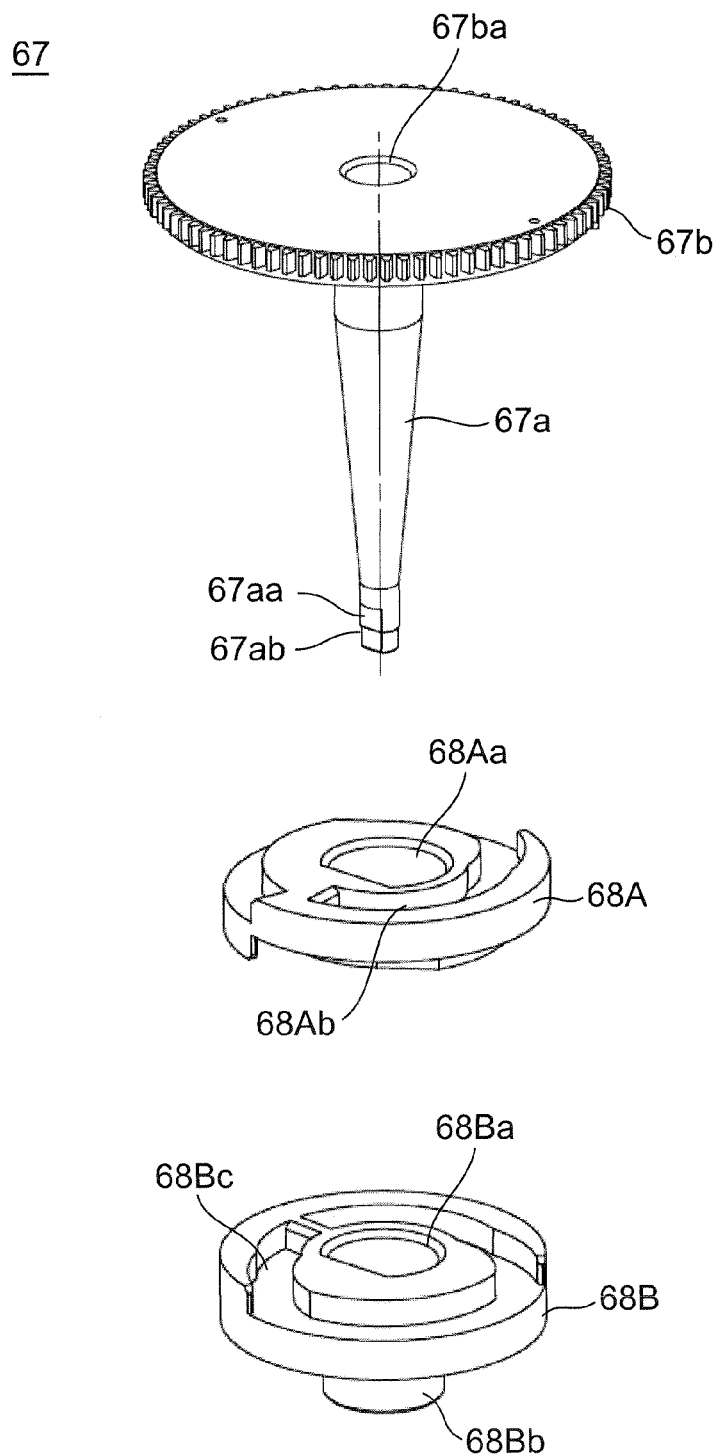
FIG. 35 is an exploded perspective view of a camshaft unit included in the disc chuck unit shown in FIG. 29.
Figure 37A:
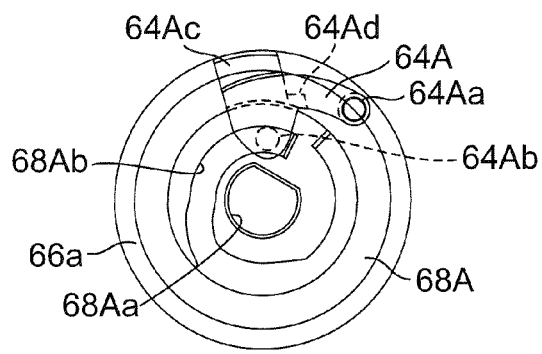
FIG. 37A is a diagram showing the manner of a drive pin of one separator hook sliding along a cam groove formed at the top face of one cam plate.
Figure 37B:
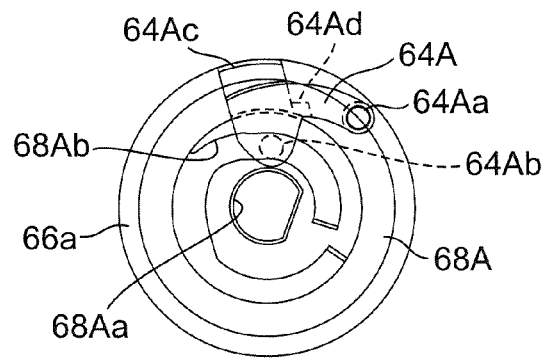
FIG. 37B is a diagram showing the manner of the drive pin of the one separator hook sliding along the cam groove formed at the top face of the one cam plate.
Figure 37C:
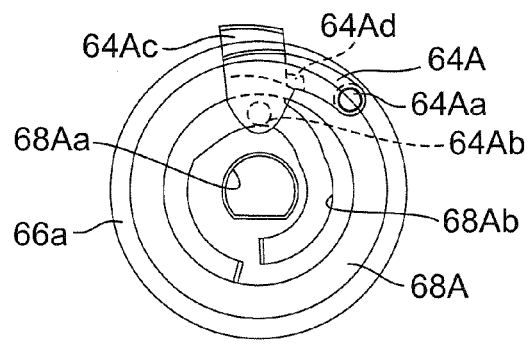
FIG. 37C is a diagram showing the manner of the drive pin of the one separator hook sliding along the cam groove formed at the top face of the one cam plate.
Figure 37D:
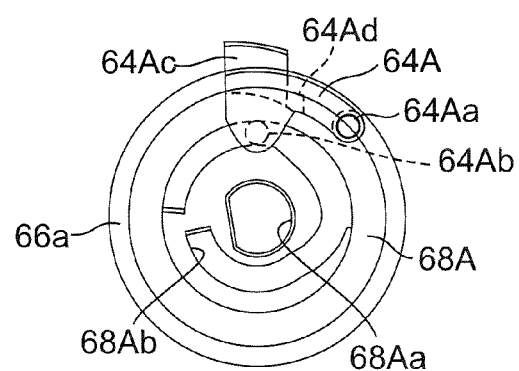
FIG. 37D is a diagram showing the manner of the drive pin of the one separator hook sliding along the cam groove formed at the top face of the one cam plate.
Figure 38A:
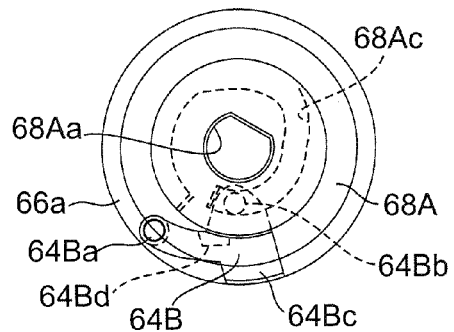
FIG. 38A is a diagram showing the manner of a drive pin of other separator hook sliding along a cam groove formed at the bottom face of the one cam plate.
Figure 38B:
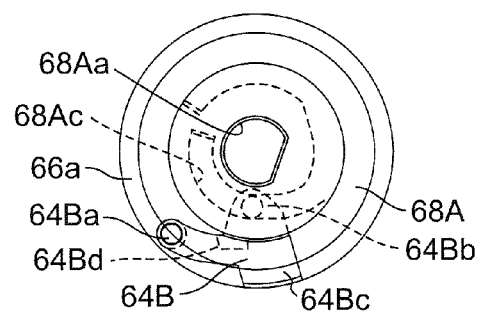
FIG. 38B is a diagram showing the manner of the drive pin of the other separator hook sliding along the cam groove formed at the bottom face of the one cam plate.
Figure 38C:
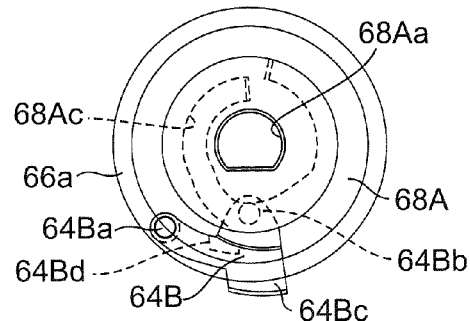
FIG. 38C is a diagram showing the manner of the drive pin of the other separator hook sliding along the cam groove formed at the bottom face of the one cam plate.
Figure 38D:
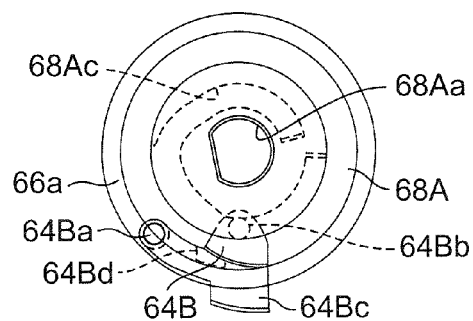
FIG. 38D is a diagram showing the manner of the drive pin of the other separator hook sliding along the cam groove formed at the bottom face of the one cam plate.
Figure 39A:
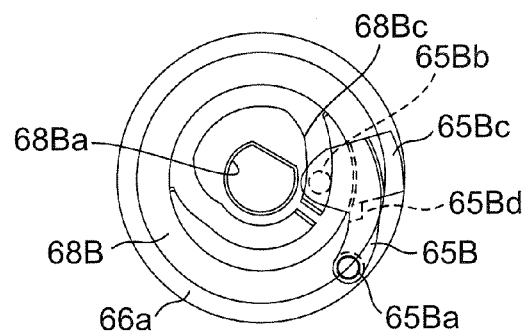
FIG. 39A is a diagram showing the manner of a drive pin of one bottom hook sliding along a cam groove formed at the top face of other cam plate.
Figure 39B:
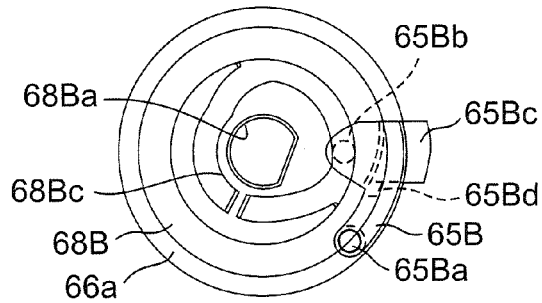
FIG. 39B is a diagram showing the manner of the drive pin of the one bottom hook sliding along the cam groove formed at the top face of the other cam plate.
Figure 39C:
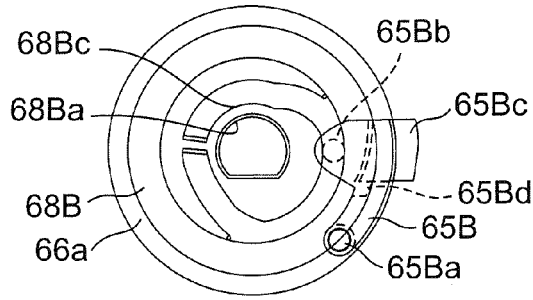
FIG. 39C is a diagram showing the manner of the drive pin of the one bottom hook sliding along the cam groove formed at the top face of the other cam plate.
Figure 39D:
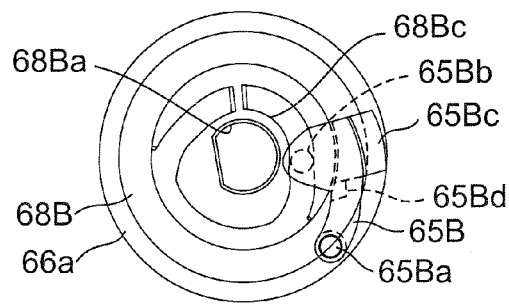
FIG. 39D is a diagram showing the manner of the drive pin of the one bottom hook sliding along the cam groove formed at the top face of the other cam plate.
Figure 40A:
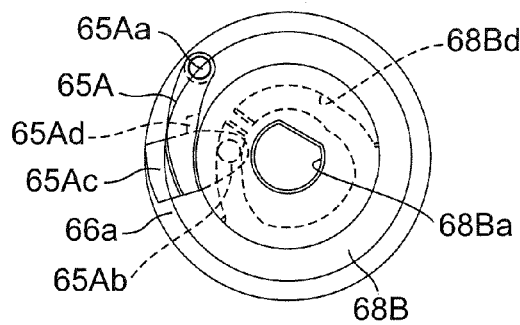
FIG. 40A is a diagram showing the manner of a drive pin of other bottom hook sliding along a cam groove formed at the bottom face of the other cam plate.
Figure 40B:
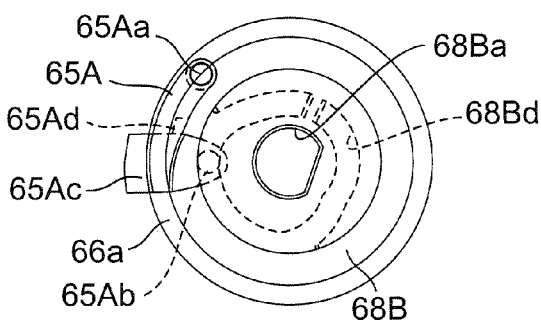
FIG. 40B is a diagram showing the manner of the drive pin of the other bottom hook sliding along the cam groove formed at the bottom face of the other cam plate.
Figure 40C:
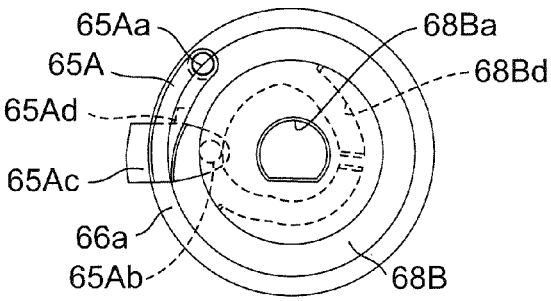
FIG. 40C is a diagram showing the manner of the drive pin of the other bottom hook sliding along the cam groove formed, at the bottom face of the other cam plate.
Figure 40D:
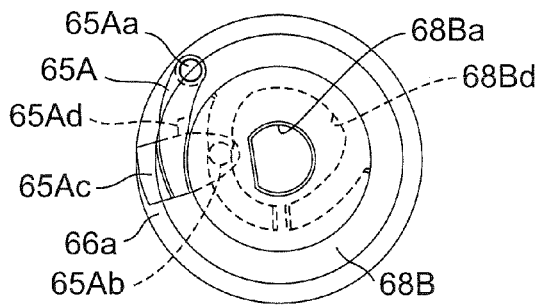
FIG. 40D is a diagram showing the manner of the drive pin of the other bottom hook sliding along the cam groove formed at the bottom face of the other cam plate.

As shown in FIG. 35, the camshaft unit 67 includes a substantially cylindrical camshaft 67a, a cam gear 67b provided at the top end portion of the camshaft 67a, and cam plates 68A, 68B provided at the bottom end portion of the camshaft 67a.

At the center portion of the cam gear 67b, a rotary shaft hole 67ba is provided. Into the rotary shaft hole 67ba, a rotary shaft (not shown) provided at the shift base 61 is inserted. As shown in FIG. 18, the cam gear 67b meshes with a relay gear 70. The relay gear 70 is structured with two gears, for example, and rotatably provided at the shift base 61. Further, as shown in FIG. 18 or 19, the relay gear 70 meshes with a motor gear 71a, into which the drive shaft of the disc chuck motor 71 provided at the shift base 61 is press fitted.

When the disc chuck motor 71 is driven, the drive force of the disc chuck motor 71 is transferred to the camshaft 67a via the motor gear 71a, the relay gear 70, and the cam gear 67b, whereby the camshaft 67a rotates. The disc chuck motor 71 is connected to the control unit of the electric circuit and the power supply 7, and drives under control of the control unit.

As shown in FIG. 35, the bottom end portion of the camshaft 67a is provided with an engaging portion 67aa for engaging with the cam plate 68A, and an engaging portion 67ab for engaging with the cam plate 68B. The engaging portions 67aa, 67ab are each formed to have a D-shaped cross section.

At the center portion of the cam plate 68A, a D-shaped rotary shaft hole 68Aa is provided. The cam plate 68A is structured so as to be capable of integrally rotating with the camshaft 67a, by the engaging portion 67aa of the camshaft 67a engaging with the rotary shaft hole 68Aa.

At the center portion of the top face of the cam plate 68B, a D-shaped rotary shaft hole 68Ba is provided. The cam plate 68B is structured so as to be capable of integrally rotating with the camshaft 67a, by the engaging portion 67ab of the camshaft 67a engaging with the rotary shaft hole 68Ba.

Further, at the center portion of the bottom face of the cam plate 68B, a rotary shaft 68Bb is provided. As shown in FIG.

29, the rotary shaft 68Bb is inserted into a rotary shaft bearing 66ab provided at the bottom end portion of the spindle shaft 66a.

The top face of the cam plate 68A is provided with a cam groove 68Ab (see FIG. 35) along which the drive pin 64Ab of the separator hook 64A slides when the camshaft 67a rotates. FIGS. 37A to 37D each show the manner of the drive pin 64Ab of the separator hook 64A sliding along the cam groove 68Ab.

The bottom face of the cam plate 68A is provided with a cam groove 68Ac (see FIG. 36) along which the drive pin 64Bb of the separator hook 64B slides when the camshaft 67a rotates. FIGS. 38A to 38D each show the manner of the drive pin 64Bb of the separator hook 64B sliding along the cam groove 68Ac. The cam groove 68Ac has mirror symmetry relative to the cam groove 68Ab, and is provided at the position being out of phase by 180 degrees in the circumferential direction of the spindle unit 66.

The top face of the cam plate 68B is provided with a cam groove 68Bc (see FIG. 35) along which the drive pin 65Bb of the bottom hook 65B slides when the camshaft 67a rotates. FIGS. 39A to 39D each show the manner of the drive pin 65Bb of the bottom hook 65B sliding along the cam groove 68Bc.

The bottom face of the cam plate 68B is provided with a cam groove 68Bd (see FIG. 36) along which the drive pin 65Ab of the bottom hook 65A slides when the camshaft 67a rotates. FIGS. 40A to 40D each show the manner of the drive pin 65Ab of the bottom hook 65A sliding along the cam groove 68Bd. The cam groove 68Bd has mirror symmetry relative to the cam groove 68Bc, and is provided at the position being out of phase by 180 degrees in the circumferential direction of the spindle unit 66.

FIGS. 41A to 41D are each a diagram focusing on the positional relationship between the camshaft 67a and the four hooks 64A to 65B.

Figure 41A:
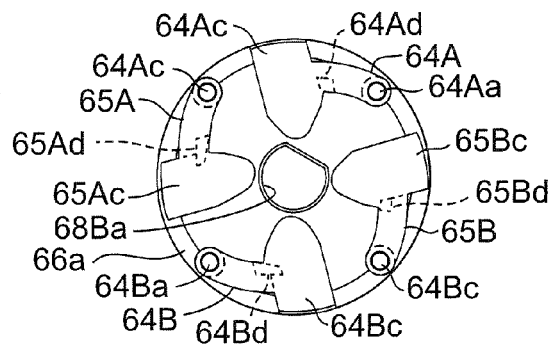
FIG. 41A is a diagram showing the manner of the hooks shown in FIGS. 37A to 40D sliding along corresponding cam grooves, focusing on the positional relationship between a camshaft and the hooks.
Figure 41B:
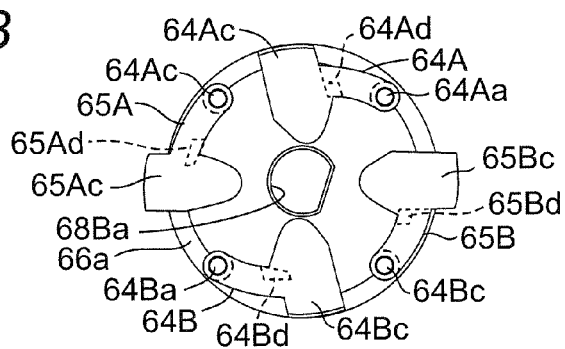
FIG. 41B is a diagram showing the manner of the hooks shown in FIGS. 37A to 40D sliding along corresponding cam grooves, focusing on the positional relationship between the camshaft and the hooks.
Figure 41C:
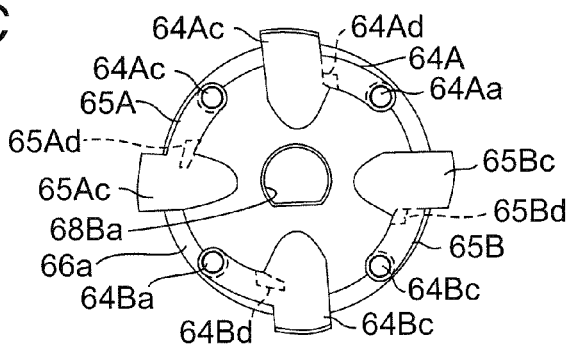
FIG. 41C is a diagram showing the manner of the hooks shown in FIGS. 37A to 40D sliding along corresponding cam grooves, focusing on the positional relationship between the camshaft and the hooks.
Figure 41D:
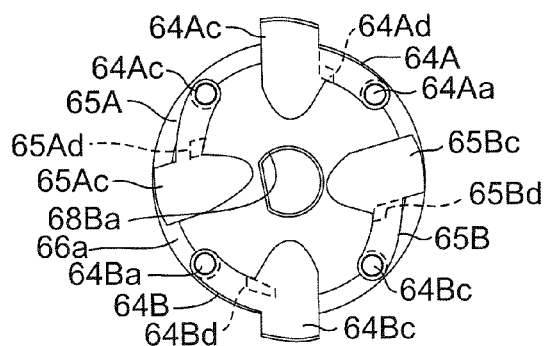
FIG. 41D is a diagram showing the manner of the hooks shown in FIGS. 37A to 40D sliding along corresponding cam grooves, focusing on the positional relationship between the camshaft and the hooks.

The separator hook 64A and the separator hook 64B shift such that, in accordance with the rotation of the camshaft 67a, their respective claw portions 64Ac, 64Bc are located at the position inside the spindle shaft 66a (see FIGS. 41A and 41B), the position outside the spindle shaft 66a (see FIG. 41C), and the position further outside the spindle shaft 66a (see FIG. 41D). It is to be noted that, the separator hooks 64A, 64B are provided with stoppers 64Ad, 64Bd for restricting the rotation range.

In the following, the position shown in FIG. 41A where all the hooks 64A to 65B are located inside the spindle shaft 66a is referred to as the stored position. Further, the position shown in FIG. 41B where only the bottom hooks 65A, 65B are located outside the spindle shaft 66a is referred to as the holding position. Further, the position shown in FIG. 41C where all the hooks 64A to 65B are located outside the spindle shaft 66a is referred to as the switching position. Further, the position shown in FIG. 41D where the separator hooks 64A, 64B are located further outside the spindle shaft 66a and the bottom hooks 65A, 65B are located inside the spindle shaft 66a is referred to as the separating position.

Next, with reference to FIGS. 42 to 50, a description will be given of the operation in which the carrier 6 separates one disc from a plurality of discs and places the separated disc on the tray 4a of the disc drive 4. It is to be noted that, throughout FIGS. 42 to 50, for the sake of convenience, the claw portions 64Ac, 64Ad of the separator hooks 64A, 64B and the claw portions 65Ac, 65Bc of the bottom hooks 65A, 65B are shown to be on an identical cross section. Further, here, the description is started from the state where the up-and-down pins 52a push out a plurality of discs 100 from the magazine tray 21.

Figure 42:
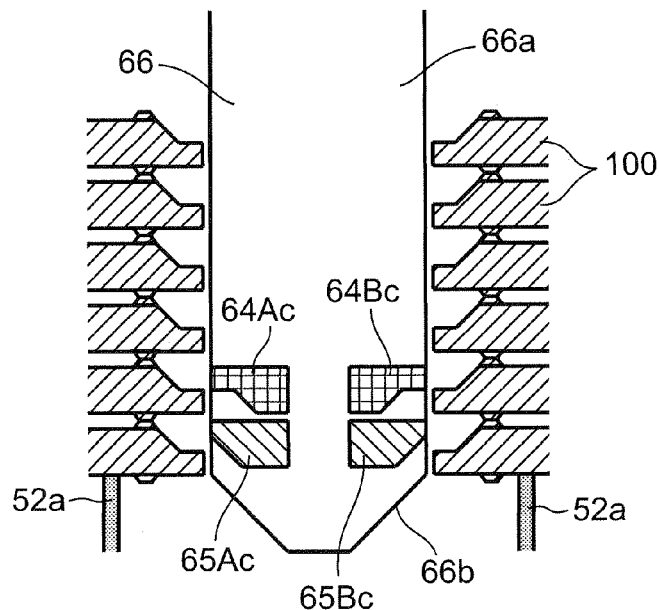
FIG. 42 is a diagram schematically showing the manner of the carrier shown in FIG. 18 separating one disc from a plurality of discs.

When the up-and-down pins 52a push out a plurality of discs 100, as shown in FIG. 42, the spindle unit 66 is inserted inside the center hole 100a of a plurality of discs 100. Here, the hooks 64A to 65B are located at the stored position (see FIG. 41A).

Figure 43:
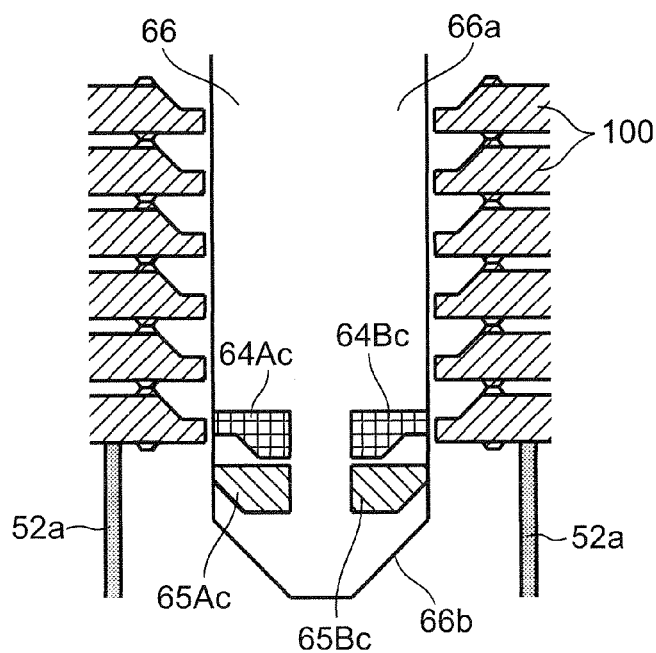
FIG. 43 is a diagram schematically showing the manner of the carrier shown in FIG. 18 separating one disc from a plurality of discs.
Figure 44:
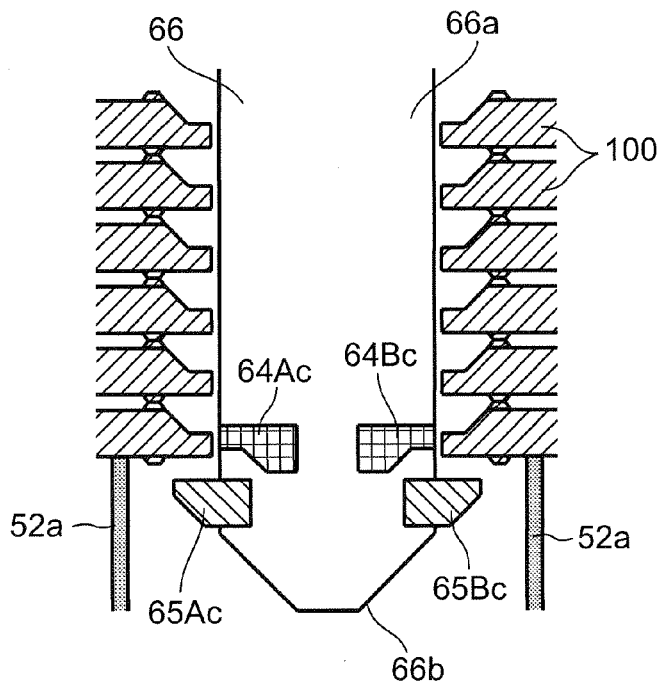
FIG. 44 is a diagram schematically showing the manner of the carrier shown in FIG. 18 separating one disc from a plurality of discs.

As shown in FIG. 43, when the up-and-down pins 52a push the plurality of discs 100 until the claw portions 65Ac, 65Bc of the bottom hooks 65A, 65B are located lower than the bottommost disc among the plurality of discs, the disc chuck motor 71 (see FIG. 19) is driven, whereby the camshaft 67a axially rotates in the normal direction. Thus, as shown in FIG. 44, the hooks 64A to 65B shift from the stored position (see FIG. 41A) to the holding position (see FIG. 41B).

Figure 45:
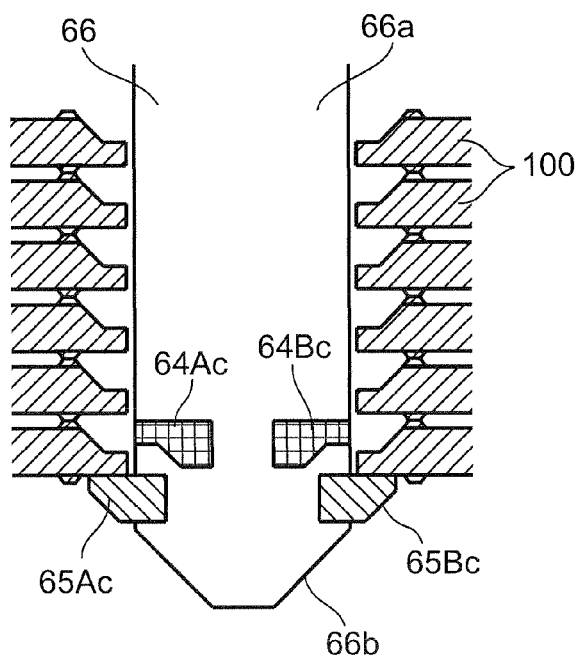
FIG. 45 is a diagram schematically showing the manner of the carrier shown in FIG. 18 separating one disc from a plurality of discs.

Thereafter, the shift base 61 is raised, and as shown in FIG. 45, the top face of the claw portions 65Ac, 65Bc of the bottom hooks 65A, 65B are brought into contact with the inner circumferential portion of the bottommost disc 100, to hold all the discs 100. Further, at this time, engagement between the spindle head 66b and the engaging portion 23a (see FIG. 2B) of the core rod 23 is released.

Figure 46:
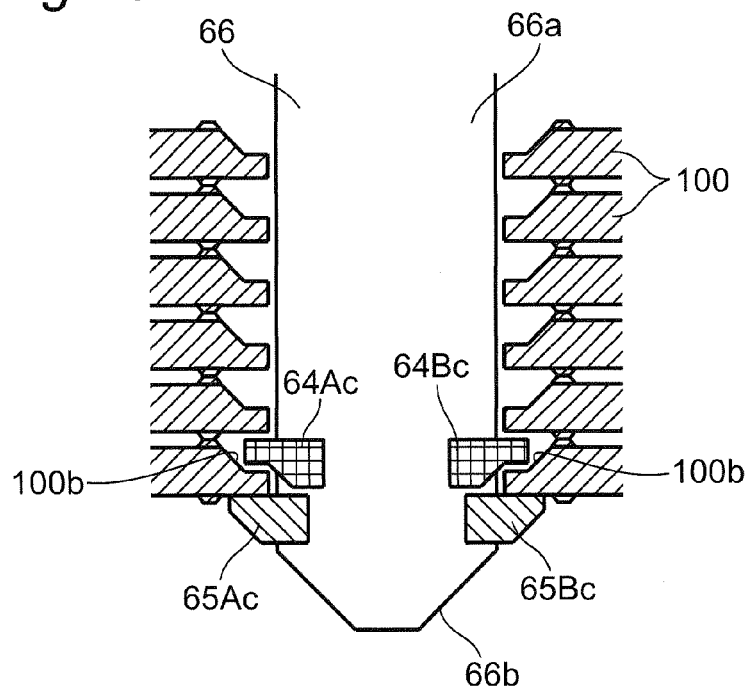
FIG. 46 is a diagram schematically showing the manner of the carrier shown in FIG. 18 separating one disc from a plurality of discs.

Thereafter, the disc chuck motor 71 (see FIG. 19) is further driven, whereby the camshaft 67a further rotates in the normal direction. Thus, the hooks 64A to 65B shift from the holding position (see FIG. 41B) to the switching position (see FIG. 41C), and as shown in FIG. 46, the claw portions 64Ac, 64Bc of the separator hooks 64A, 64B are inserted into the recess portion 100b of the bottommost disc 100.

Thereafter, the picker 3 shifts to the device-front side, whereby the magazine tray 21 recedes from the position near the disc drive 4 (see FIG. 22). Thereafter, the tray 4a of the disc drive 4 is discharged (see FIG. 23).

Figure 47:
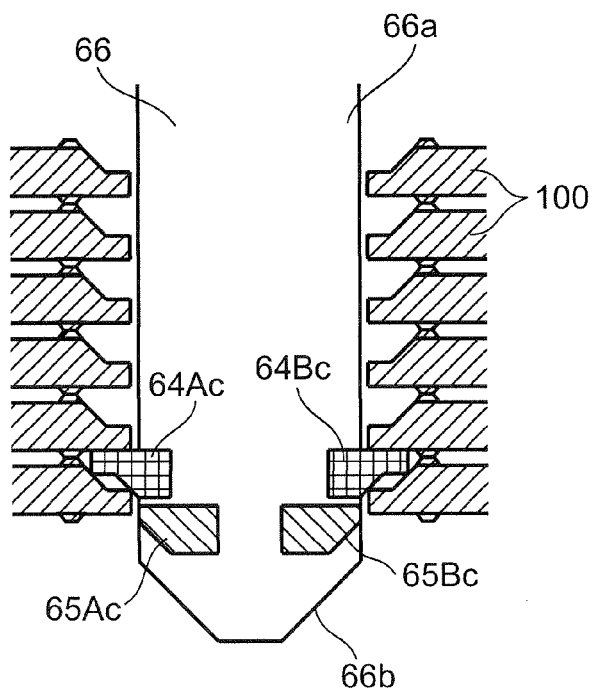
FIG. 47 is a diagram schematically showing the manner of the carrier shown in FIG. 18 separating one disc from a plurality of discs.
Figure 48:
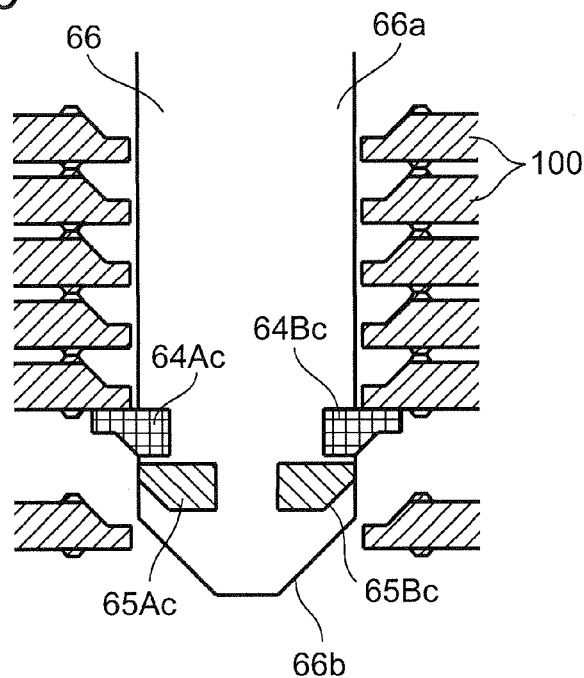
FIG. 48 is a diagram schematically showing the manner of the carrier shown in FIG. 18 separating one disc from a plurality of discs.

Thereafter, the shift base 61 is lowered such that the plurality of discs 100 retained by the spindle unit 66 is located above the tray 4a (e.g., immediately above). In this state, the disc chuck motor 71 is further driven, and the camshaft 67a is rotated further in the normal direction. Thus, the hooks 64A to 65B shift from the switching position (see FIG. 41C) to the separating position (see FIG. 41D), and as shown in FIG. 47, the claw portions 65Ac, 65Bc of the bottom hooks 65A, 65B shift to the position inside the spindle shaft 66a. As a result, as shown in FIG. 48, the bottommost disc 100 falls by its self weight, to be placed on the tray 4a. Further, at this time, the inclined face formed at the bottom face of each of the claw portions 64Ac, 64Bc of the separator hooks 64A, 64B pushes the bottommost disc 100 downward, to function to aid the disc 100 in falling by its self weight. Still further, at this time, the separator hooks 64A, 64B further project outside the spindle shaft 66a, and the top faces of the claw portions 64Ac, 64Bc of the separator hooks 64A, 64B are brought into contact with the inner circumferential portion of the bottommost disc 100 out of the rest of the disc, and hold the rest of the discs 100.

When the bottommost disc 100 is placed on the tray 4a, the shift base 61 is raised such that the spindle unit 66 and the tray 4a are not brought into contact with each other. Thereafter, the tray 4a is carried into the disc drive 4. Thereafter or simultaneously therewith, the tray 4a of the disc drive 4 opposing to the handled disc drive is ejected (not shown).

Figure 49:
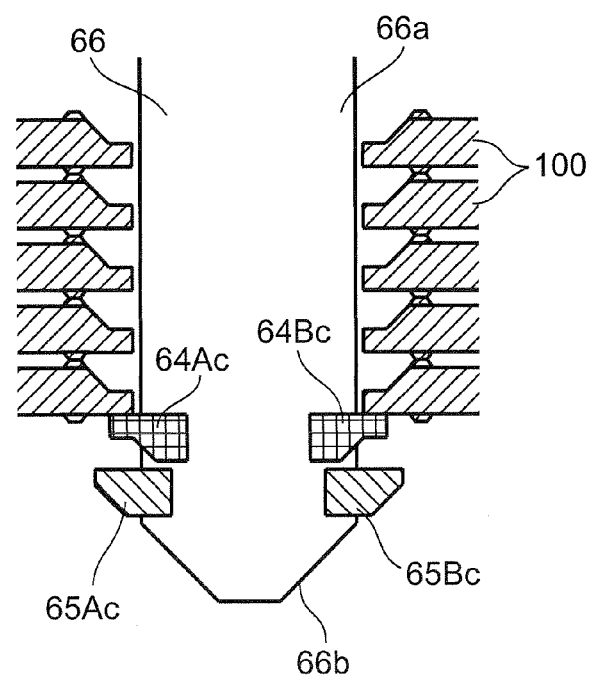
FIG. 49 is a diagram schematically showing the manner of the carrier shown in FIG. 18 separating one disc from a plurality of discs.

Thereafter, the disc chuck motor 71 is reversely driven, whereby the camshaft 67a rotates in the reverse direction. Thus, the hooks 64A to 65B shift from the separating position (see FIG. 41D) to the switching position (see FIG. 41C), and as shown in FIG. 49, the claw portions 65Ac, 65Bc of the bottom hooks 65A, 65B shift to the positions outside the spindle shaft 66a.

Figure 50:
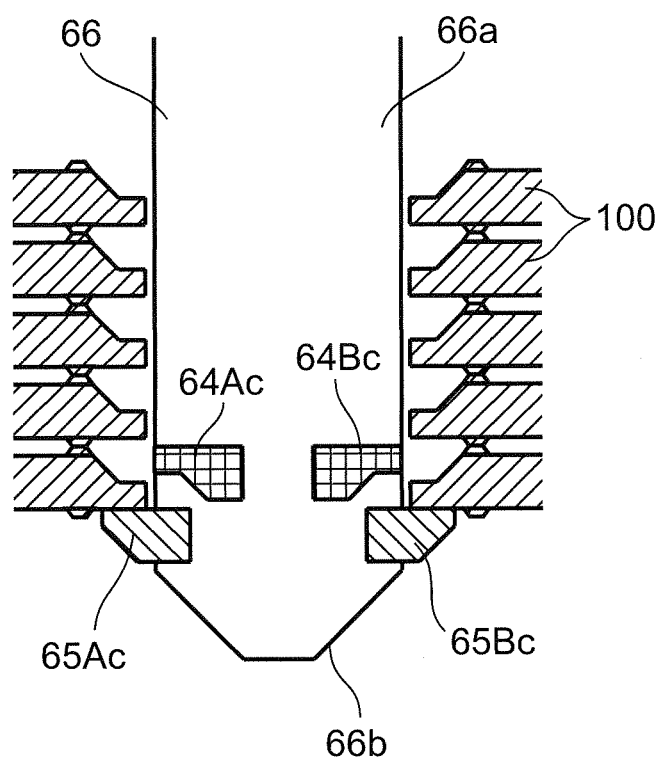
FIG. 50 is a diagram schematically showing the manner of the carrier shown in FIG. 18 separating one disc from a plurality of discs.

Thereafter, the disc chuck motor 71 is further reversely driven, whereby the camshaft 67*a* further rotates in the reverse direction. Thus, the hooks 64A to 65B shift from the switching position (see FIG. 41C) to the holding position (see FIG. 41B), whereby the claw portions 64Ac, 64Bc of the separators 64A, 64B shift to the positions inside the spindle shaft 66*a* as shown in FIG. 50. As a result, the rest of the discs 100 held by the top face of the claw portions 64Ac, 64Bc of the separator hooks 64A, 64B fall by their self weight, and held by the top face of the claw portions 65Ac, 65Bc of the bottom hooks 65A, 65B.

Thereafter, the disc chuck motor 71 is driven, whereby the camshaft 67*a* rotates in the normal direction. Thus, the hooks 64A to 65B shifts from the holding position (see FIG. 41B) to the switching position (see FIG. 41C), and as shown in FIG. 46, the claw portions 64Ac, 64Bc of the separator hooks 64A, 64B are inserted into the recess portion 100*b* of the bottommost disc 100.

Thereafter, the shift base 61 is lowered such that the plurality of discs 100 retained by the spindle unit 66 is located above (e.g., immediately above) the ejected tray 4*a*. In this state, the disc chuck motor 71 is further driven, whereby the camshaft 67*a* further shifts in the normal direction. Thus, the hooks 64A to 65B shift from the switching position (see FIG. 41C) to the separating position (see FIG. 41D), and as shown in FIG. 47, the claw portions 65Ac, 65Bc of the bottom hooks 65A, 65B shift to the position inner than the spindle shaft 66*a*. As a result, as shown in FIG. 48, the bottommost disc 100 falls by its self weight, to be placed on the tray 4*a*. Further, at this time, the separator hooks 64A, 64B further project outside the spindle shaft 66*a*, and the inclined face formed at the bottom face of each of the claw portions 64Ac, 64Bc of the separator hooks 64A, 64B pushes the bottommost disc 100 downward, to function to aid the disc 100 in falling by its self weight. Still further, at this time, the top faces of the claw portions 64Ac, 64Bc of the separator hooks 64A, 64B are brought into contact with the inner circumferential portion of the bottommost disc out of the rest of the discs, and hold the rest of the discs 100.

When the bottommost disc 100 is placed on the tray 4*a*, the shift base 61 is raised such that the spindle unit 66 and the tray 4*a* are not brought into contact with each other. Thereafter, the tray 4*a* is carried into the disc drive 4. Thus, the loading operation as to the disc drives 4 of the bottommost stage (first stage) is completed. This loading operation is repeated as to the second and following stages.

When the loading operation to the topmost-stage disc drives 4 is completed, all the disc drives 4 now accommodate the discs 100, and recording on or reproduction from the discs 100 in the disc drives 4 is enabled.

Next, a description will be given of the operation of the carrier 6 collecting the discs 100 from the disc drives 4.

Firstly, the tray 4*a* of the topmost-stage disc drive 4 is ejected.

Thereafter, the shift base 61 is lowered, and the spindle unit 66 is inserted into the center hole 100*a* of the disc 100 on the tray 4*a*. At this time, the hooks 64A to 65B are at the stored position (see FIG. 41A).

When the shift base 61 is lowered until the disc 100 is located above the bottom hooks 65A, 65B, the disc chuck motor 71 (see FIG. 19) is driven, whereby the camshaft 67*a* rotates in the normal direction. Thus, the hooks 64A to 65B shift from the stored position (see FIG. 41A) to the holding position (see FIG. 41B).

Thereafter, the shift base 61 is raised, and the top face of the claw portions 65Ac, 65Bc of the bottom hooks 65A, 65B are brought into contact with the inner circumferential portion of the disc 100, to retain the disc 100. Thus, the disc 100 on the tray 4*a* is collected.

Thereafter, the tray 4*a* from which the disc 100 is collected is carried into the disc drive 4. Thereafter or simultaneously therewith, the tray 4*a* of the disc drive 4 opposing to the handled disc drive 4 is ejected.

Thereafter, the shift base 61 is lowered such that the disc retained by the spindle unit 66 is located above (e.g., immediately above) the disc 100 on the ejected tray 4*a*.

Thereafter, the disc chuck motor 71 (see FIG. 19) is reversely driven, and the camshaft 67*a* rotates in the reverse direction. Thus, the hooks 64A to 65B shift from the holding position (see FIG. 41B) to the stored position (see FIG. 41A). Thus, the disc 100 retained by the spindle unit 66 falls by its self weight, and stacked on the disc 100 on the ejected tray 4*a*.

Thereafter, the shift base 61 is lowered, and the spindle unit 66 is inserted into the center holes 100*a* of the two discs 100 on the ejected tray 4*a*.

When the shift base 61 is lowered until the two discs 100 are located above the bottom hooks 65A, 65B, the disc chuck motor 71 (see FIG. 19) is driven, whereby the camshaft 67*a* rotates in the normal direction. Thus, the hooks 64A to 65B shift from the stored position (see FIG. 41A) to the holding position (see FIG. 41B).

Thereafter, the shift base 61 is raised, and the top faces of the claw portions 65Ac, 65Bc of the bottom hooks 65A, 65B are brought into contact with the inner circumferential portion of the bottommost disc 100, to hold all the discs 100.

Thereafter, the tray 4*a* from which the disc 100 is collected is carried into the disc drive 4. Thus, the disc collection operation of the disc drives 4 of the topmost stage (first stage) is completed. This disc collection operation is repeated until the discs 100 in the bottommost-stage disc drives 4 are collected.

When the spindle unit 66 has collected all the discs 100, the shift base 61 is raised. Thereafter, the picker 3 shifts to the device-rear side, and the magazine tray 21 is set below the spindle unit 66.

Thereafter, the shift base 61 is lowered, and the spindle head 66*b* (see FIG. 33) engages with the engaging portion 23*a* (see FIG. 2B) of the core rod 23, whereby the spindle head 66*b* and the core rod 23 become coaxial to each other.

Thereafter, the disc chuck motor 71 (see FIG. 19) is reversely driven, whereby the camshaft 67*a* rotates in the reverse direction. Thus, the hooks 64A to 65B shift from the holding position (see FIG. 41B) to the stored position (see FIG. 41A). Thus, all the discs 100 retained by the spindle unit 66 fall by their self weight along the spindle head 66*b* and the core rod 23, and stored in the magazine tray 21.

Next, a more detailed description will be given of the structure of the shift base 61.

Figure 51:
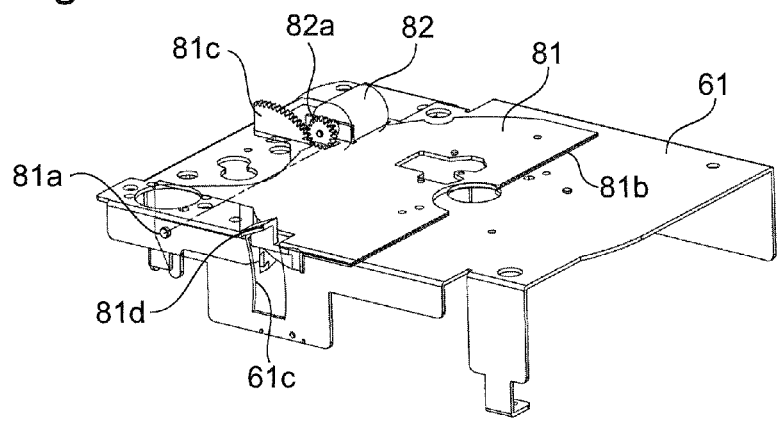
FIG. 51 is a partially transparent perspective view of the positional relationship among the shift base, a disc press, and an encoder included in the carrier shown in FIG. 18, in the state where the disc press is pressing no discs.

As shown in FIG. 51, the shift base 61 includes a disc press 81, and an encoder 82 being an exemplary disc height position detecting unit.

Figure 52:
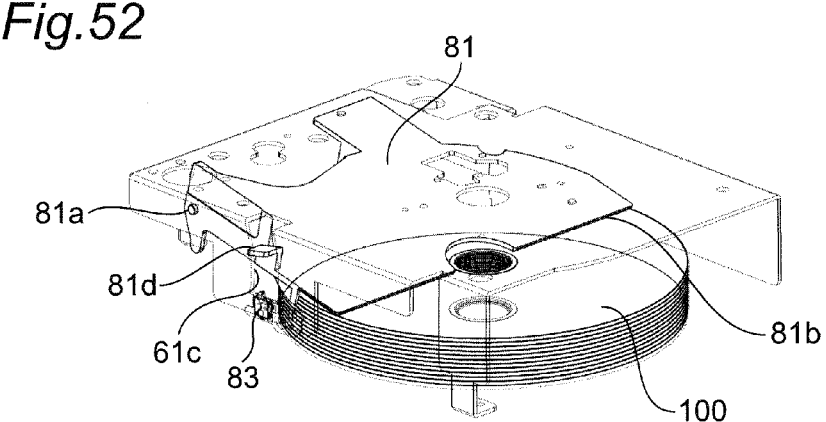
FIG. 52 is a partially transparent perspective view of the positional relationship among the shift base, the disc press, and the switch included in the carrier shown in FIG. 18, in the state where the disc press is pressing a plurality of discs.
Figure 53:
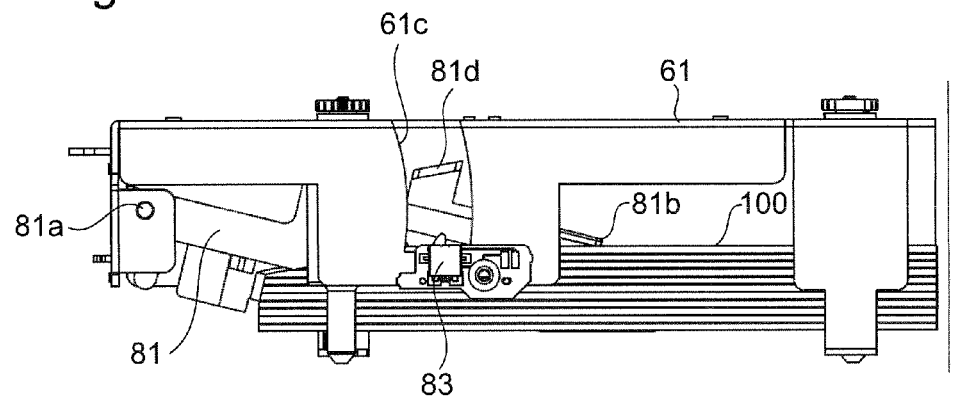
FIG. 53 is a side view showing the positional relationship among the shift base, the disc press, and the switch included in the carrier shown in FIG. 18, in the state where the disc press is pressing a plurality of discs.

As shown in FIG. 52, the disc press 81 is structured to press the topmost disc 100 of the plurality of discs, such that the topmost disc 100 is in parallel to the disc placing face of the tray 4*a* (see FIG. 23). In the present embodiment, as shown in FIGS. 52 and 53, the disc press 81 is provided so as to be rotatable about one end portion 81*a*, and to be brought into contact with the topmost disc 100 (e.g., line contact) by other end portion 81*b*.

As shown in FIG. 51, a rack 81*c* is provided at the top face of the disc press 81. The rack 81*c* meshes with a pinion gear 82*a*, which is fixed to the rotation shaft of the encoder 82. The pinion gear 82*a* rotates by the amount corresponding to the rotation amount (rotation angle) of the disc press 81. The encoder 82 senses the rotation amount of this pinion gear 82a to sense the rotation amount of the disc press 81, to eventually sense the height position of the topmost disc 100.

At the side portion of the disc press 81, a lever 81d is provided. The lever 81d shifts along a guide hole 61c provided at the side face of the shift base 81, when the disc press 81 rotates. As shown in FIGS. 52 and 53, a switch 83 being an exemplary disc presence-absence detecting unit is provided at the bottom end portion of the guide hole 61c.

Figure 54:
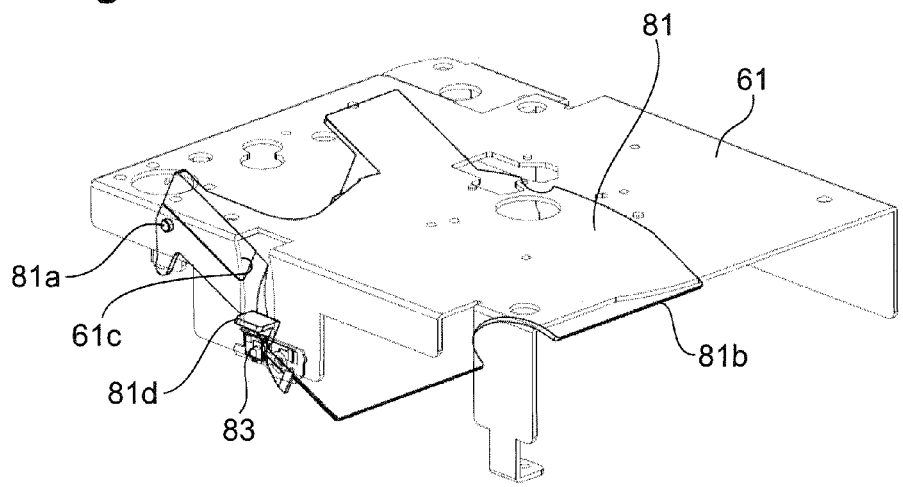
FIG. 54 is a partially transparent perspective view of the positional relationship among the shift base, the disc press, and the switch included in the carrier shown in FIG. 18, in the state where the disc press is in contact with the switch.
Figure 55:
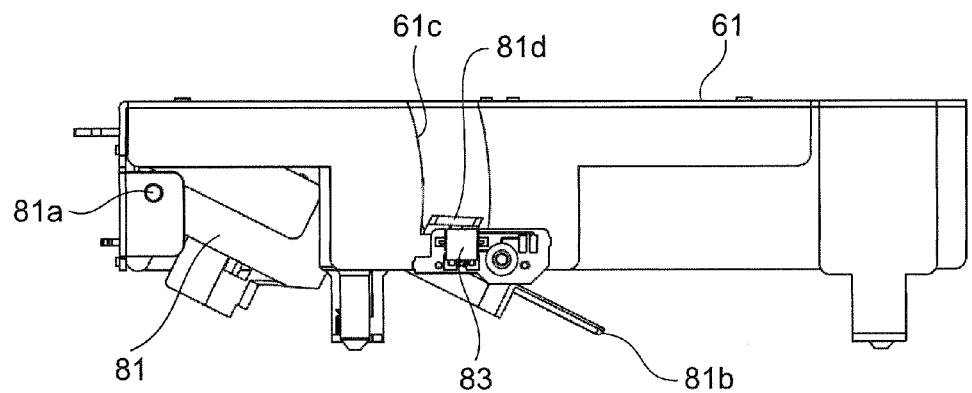
FIG. 55 is a side view showing the positional relationship among the shift base, the disc press, and the switch included in the carrier shown in FIG. 18, in the state where the disc press is in contact with the switch.

The switch 83 senses whether or not the disc chuck unit 62 retains at least one disc 100, based on whether or not the switch 83 is brought into contact with the lever 81d of the disc press 81. In the present embodiment, as shown in FIGS. 52 and 53, when the switch 83 is not in contact with the lever 81d of the disc press 81, the switch 83 senses the presence of the disc 100 retained by the disc chuck unit 62. On the other hand, as shown in FIGS. 54 and 55, when the switch 83 is in contact with the lever 81d of the disc press 81, the switch 83 senses the absence of the disc 100 retained by the disc chuck unit 62.

With the disc device according to the present embodiment, provision of the disc press 81 makes it possible to stably retain the stacked plurality of discs 100 in such a stacked state, and to place a disc 100 to the tray 4a of each of the plurality of disc drives 4 more accurately.

Further, with the disc device according to the present embodiment, the disc press 81 is provided so as to be rotatable about the one end portion 81a, and to be brought into contact with the topmost disc 100 at the other end portion 81b. Thus, the other end portion 81b of the disc press 81 can press the topmost disc 100 in a substantially perpendicular direction to the disc placing face of the tray 4a, and the disc 100 can be placed on the tray 4a more accurately.

Further, with the disc device according to the present embodiment, by the encoder 82 sensing the height position of the topmost disc 100, whether or not the discs 100 are appropriately separated from each other one by one by the disc chuck unit 62 can be sensed. In other words, it becomes possible to sense occurrence of any trouble, such as a plurality of discs 100 being placed on one tray 4a because the discs 100 are not appropriately separated but in close contact with one another due to electrostatic buildup or the like. It is to be noted that the thickness of the disc 100 is, for example, approximately 1.36 mm. In this case, by the encoder 82 sensing a change in the height position of the topmost disc 100 by 1.36 mm, it becomes possible to sense whether or not one disc 100 has been appropriately separated by the disc chuck unit 62.

Further, with the disc device according to the present embodiment, by the encoder 82 sensing the rotation amount of the disc press 81 in the state where the attitude of the topmost disc 100 is stabilized by the disc press 81, the height position of the topmost disc 100 is sensed. Thus, the height position of the topmost disc 100 can be sensed at high precision.

Further, with the disc device according to the present embodiment, the switch 83 can sense whether or not there is any disc 100 retained by the disc chuck unit 62. Thus, for example, if the switch 83 senses the presence of any disc 100 retained by the disc chuck unit 62 despite the placement of all the discs 100 to the trays 4a has been scheduled to complete, then it can be sensed that some trouble has occurred, e.g., the disc chuck unit 62 failing to appropriately separate a disc 100.

It is to be noted that, as shown in FIG. 56, for example, the other end portion 81b of the disc press 81 is provided so as to be in contact with the substantial diameter portion of the topmost disc 100. Thus, it becomes possible to more evenly press the topmost disc 100, and to further suppress the outer circumferential side of each disc 100 from wobbling.

Figure 56A:
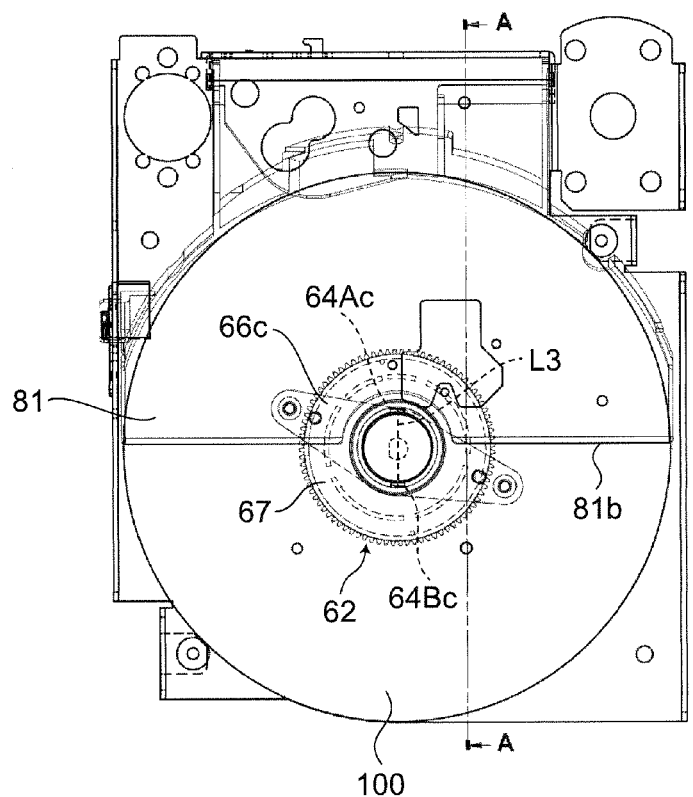
FIG. 56A is a partially transparent plan view showing the positional relationship among the disc chuck unit, the shift base, and the disc press included in the carrier shown in FIG. 18, in the state where the disc press is pressing one disc.
Figure 56B:
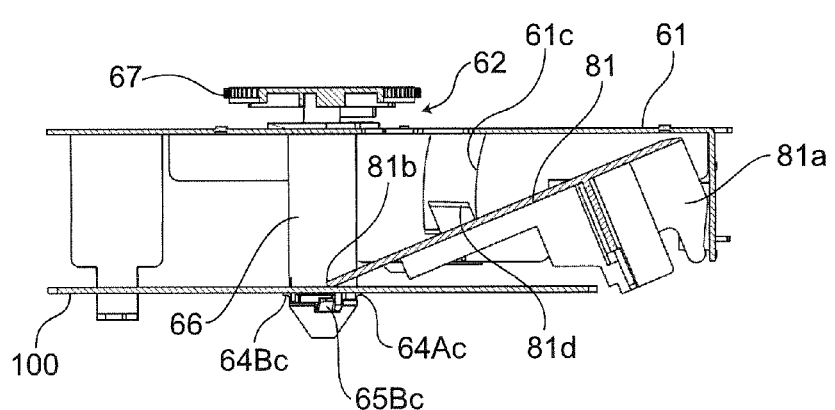
FIG. 56B is a cross sectional view taken along line A-A in FIG. 56A.

Further, as shown in FIGS. 56A and 56B, for example, the other end portion 81b of the disc press 81 is provided so as to, in planar view, pass line segment L3 connecting between the claw portions 64Ac, 64Bc of the separator hooks 64A, 64B and to extend in the direction crossing (e.g., perpendicularly crossing) the line segment L3. Thus, it becomes possible to more evenly press the topmost disc 100, and to further suppress the outer circumferential side of the disc 100 from wobbling.

Further, for example, the other end portion 81b of the disc press 81 is provided so as to, in planar view, pass the line segment connecting between the claw portions 64Ac, 64Bc of the separator hooks 64A, 64B, and to extend in the direction crossing (e.g., perpendicularly crossing) the line segment L3. Thus, it becomes possible to more evenly press the topmost disc 100, and to further suppress the outer circumferential side of the disc 100 from wobbling.

It is to be noted that, in the foregoing, though the inner circumferential portion of the bottommost disc 100 is held by the two claw portions, i.e., the claw portions 64Ac, 64Bc (or the claw portions 65Ac, 65Bc), the present disclosure is not limited thereto. The claw portions holding the inner circumferential portion of the bottommost disc 100 may be provided by three or more in number. In this case, for example, the other end portion 81b of the disc press 81 is provided so as to, in planar view, pass the line segment connecting between two claw portions out of the three or more claw portions, and to extend in the direction crossing the line segment. Thus, it becomes possible to more evenly press the topmost disc 100, and to further suppress the outer circumferential side of the disc 100 from wobbling.

Further, for example, the length of the contact portion between the topmost disc 100 and the other end portion 81b of the disc press 81 is, for example as shown in FIG. 56, substantially identical to the diameter of the disc 100 subtracted by the diameter of the center hole 100a. Thus, it becomes possible to more evenly press the topmost disc 100, and to further suppress the outer circumferential side of the disc 100 from wobbling.

It is to be noted that, the other end portion 81b of the disc press 81 may be structured so as to be in contact only with the non-write region of the outer circumferential portion of the topmost disc 100. In this case, it becomes possible to suppress the outer circumferential side of the disc 100 from wobbling, and to prevent the write region of the topmost disc 100 from being damaged.

Further, in the foregoing, though the disc press 81 is provided to rotate about the one end portion 81a, the present disclosure is not limited thereto. The disc press 81 is only required to be provided to be capable of pushing the topmost disc 100 substantially perpendicularly to the disc placing face of the tray 4a.

Further, in the foregoing, though it is structured such that the height position of the topmost disc 100 is sensed by the encoder 82 sensing the rotation amount of the disc press 81, the present disclosure is not limited thereto. For example, it is also possible to structure to allow the disc press 81 to shift only in the disc thickness direction (height direction), such that the height position of the topmost disc 100 is sensed by the encoder 82 sensing the height position of the disc press 81.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

Since the disc device of the present disclosure is capable of stably retaining a stacked plurality of discs in such a stacked state, and placing each disc on the tray of each of a plurality of disc drives more accurately, the present disclosure is particularly useful for a disc device including a multitude of magazines.

The disclosure of Japanese Patent Application No. 2012-127160 filed on Jun. 4, 2012 including specification, drawing and claims are incorporated herein by reference in its entirety.

What is claimed is:

1. A disc device supplying a disc to each of a plurality of disc drives, the disc device comprising:
    a carrier which retains a plurality of discs being stacked in such a stacked state, which separates one disc from the retained plurality of discs above a tray ejected from an arbitrary one of the disc drives, and which places the one separated disc on the tray, wherein
    the carrier includes:
    a plurality of claw portions which hold an inner circumferential portion of a bottommost disc out of the plurality of discs; and
    a disc press which presses a topmost disc of the plurality of discs so that the topmost disc is in parallel to a disc placing face of the tray.

2. The disc device according to claim 1, wherein
the disc press is provided so as to be rotatable about a first end portion of the disc press, and so that a second end portion of the disc press is brought into contact with the topmost disc.

3. The disc device according to claim 2, wherein
the second end portion of the disc press is provided so as to be brought into contact with a substantial diameter portion of the topmost disc.

4. The disc device according to claim 2, wherein
the second end portion of the disc press is provided so as to, in planar view, pass a line segment connected between two claw portions out of the plurality of claw portions, and to extend in a direction crossing the line segment.

5. The disc device according to claim 4, wherein
a length of a contact portion between the topmost disc and the second end portion of the disc press is substantially identical to a length of a diameter of the topmost disc subtracted by a diameter of a center hole of the topmost disc.

6. The disc device according to claim 1, wherein
the carrier further includes a disc height position detecting unit detecting a height position of the topmost disc.

7. The disc device according to claim 2, wherein
the carrier includes a disc height position detecting unit, the disc height position detecting unit sensing a rotation amount of the disc press to sense a height position of the topmost disc.

8. The disc device according to claim 1, further comprising
a disc presence-absence detecting unit being out of contact with the disc press when the carrier retains the disc, and being in contact with the disc press when the carrier does not retain the disc, to sense presence and absence of the disc retained by the carrier.

* * * * *